United States Patent [19]
Minor

[11] Patent Number: 5,985,939
[45] Date of Patent: Nov. 16, 1999

[54] PROCESSES FOR PRODUCING AEROSOL PROPELLANTS THAT INCLUDE BUTANE OR ISOBUTANE

[75] Inventor: Barbara Haviland Minor, Elkton, Md.

[73] Assignee: E.I. du Pont de Nemours and Company, Wilmington, Del.

[21] Appl. No.: 08/877,740

[22] Filed: Jun. 17, 1997

Related U.S. Application Data

[63] Continuation-in-part of application No. 08/541,055, Oct. 11, 1995, Pat. No. 5,681,501.

[51] Int. Cl.$^6$ ..................................................... C09K 3/30
[52] U.S. Cl. ............................................... 516/8; 510/408
[58] Field of Search ..................... 252/305, 67; 510/408; 516/8

[56] References Cited

U.S. PATENT DOCUMENTS

| | | | |
|---|---|---|---|
| 4,174,295 | 11/1979 | Bargigia et al. | 252/305 |
| 4,198,313 | 4/1980 | Bargigia et al. | 252/305 |
| 5,458,798 | 10/1995 | Lunger et al. | 252/67 |
| 5,538,659 | 7/1996 | Chisolm et al. | 252/67 |
| 5,558,810 | 9/1996 | Minor et al. | 252/67 |
| 5,605,882 | 2/1997 | Klug et al. | 510/411 |
| 5,650,089 | 7/1997 | Gage et al. | 252/67 |

FOREIGN PATENT DOCUMENTS 2089860  8/1993  Canada.

OTHER PUBLICATIONS

Chemical Abstracts, AN 97:26023, "Vapor–liquid equilibrium data for the propane, n–butane, isobutane, and propylene/isopropyl fluoride systems", Parrish et al., 1982.

Parrish et al, "Vapor–Liquid Equilibrium Data for the Propane/–, n–Butane/–, Isobutane/–and Propylene/Isopropyl Fluoride Systems at 30 and 50° C.", J. Chem. Eng. Data, vol. 27, No. 3, Jul. 1982.

Primary Examiner—Christine Skane
Attorney, Agent, or Firm—James E. Shipley

[57] ABSTRACT

The invention relates to the discovery of compositions useful as aerosol propellants that include a first component of butane or isobutane and a second component of 2-fluoropropane (HFC-281 ea) or 1-fluoropropane (HFC-282 fa).

3 Claims, 38 Drawing Sheets

PROCESSES FOR PRODUCING AEROSOL PROPELLANTS THAT INCLUDE BUTANE OR ISOBUTANE

RELATIONSHIP TO OTHER APPLICATIONS

This application is a Continuation-In-Part of Ser. No. 08/541,055, filing date Oct. 11, 1995 now U.S. Pat. No. 5,681,501.

FIELD OF THE INVENTION

This invention relates to compositions that include a hydrofluoropropane. These compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include trichlorofluoromethane (CFC-11) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance.

Accordingly, it is desirable to use as a refrigerant a single fluorinated hydrocarbon or an azeotropic or azeotrope-like composition that includes one or more fluorinated hydrocarbons.

Fluorinated hydrocarbons may also be used as cleaning agents or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosols, as heat transfer media, gaseous dielectrics, fire extinguishing agents or power cycle working fluids such as for heat pumps. These compositions may also be used as inert media for polymerization reactions, fluids for removing particulates from metal surfaces, as carrier fluids that may be used, for example, to place a fine film of lubricant on metal parts or as buffing abrasive agents to remove buffing abrasive compounds from polished surfaces such as metal. They are also used as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of compositions which include a first component of tetrafluoropropane, trifluoropropane, difluoropropane or fluoropropane and a second component of tetrafluoropropane, trifluoropropane, difluoropropane, fluoropropane and 1,1,1-trifluoro-2-trifluoromethylpropane, a hydrocarbon or dimethylether. These compositions are useful as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

Further, the invention relates to the discovery of binary azeotropic or azeotrope-like compositions comprising effective amounts of tetrafluoropropane, trifluoropropane, difluoropropane or fluoropropane and a second component of tetrafluoropropane, trifluoropropane, difluoropropane, fluoropropane and 1,1,1-trifluoro-2-trifluoromethylpropane, a hydrocarbon or dimethylether, to form an azeotropic or azeotrope-like composition.

BRIEF DESCRIPTION OF THE DRAWINGS

FIG. 34 is a graph of the vapor/liquid equilibrium curve for mixtures of HFC-272fb and butane at;

DETAILED DESCRIPTION

Figure 1:
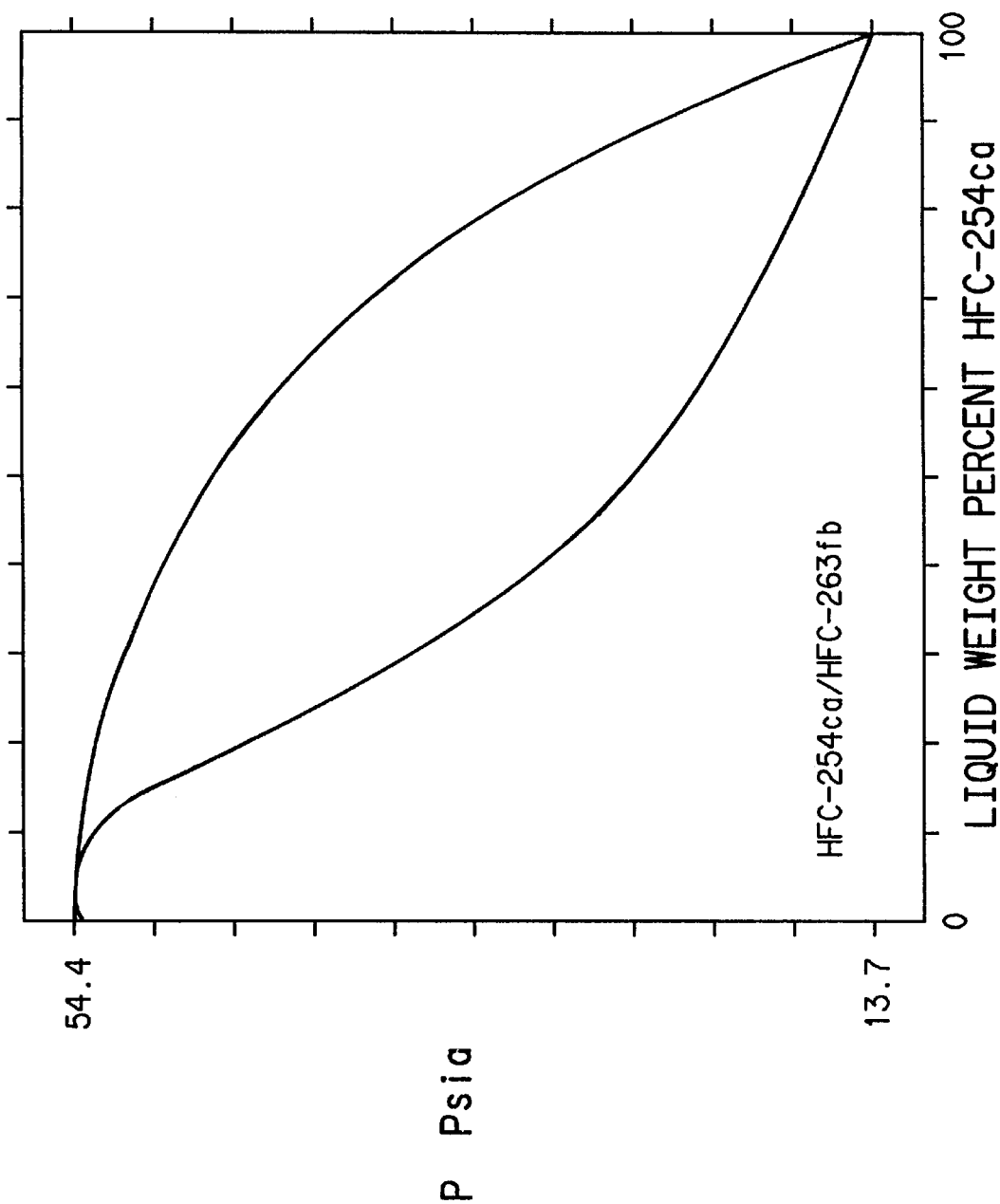
FIG. 1 is a graph of the vapor/liquid equilibrium curve for mixtures of HFC-254ca and HFC-263fb at 25° C.
Figure 2:
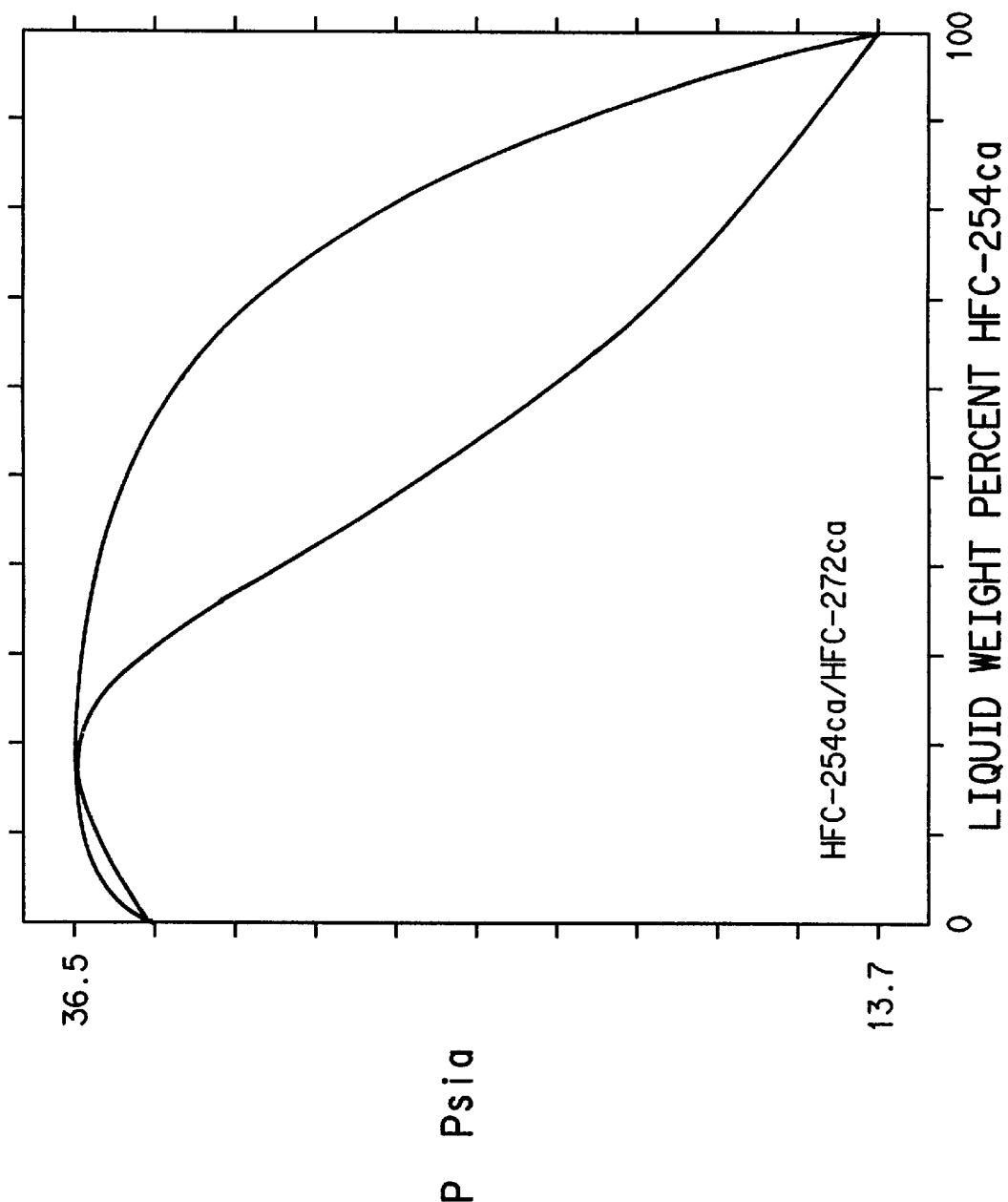
FIG. 2 is a graph of the vapor/liquid equilibrium curve for mixtures of HFC-254ca and HFC-272ca at 25° C.
Figure 3:
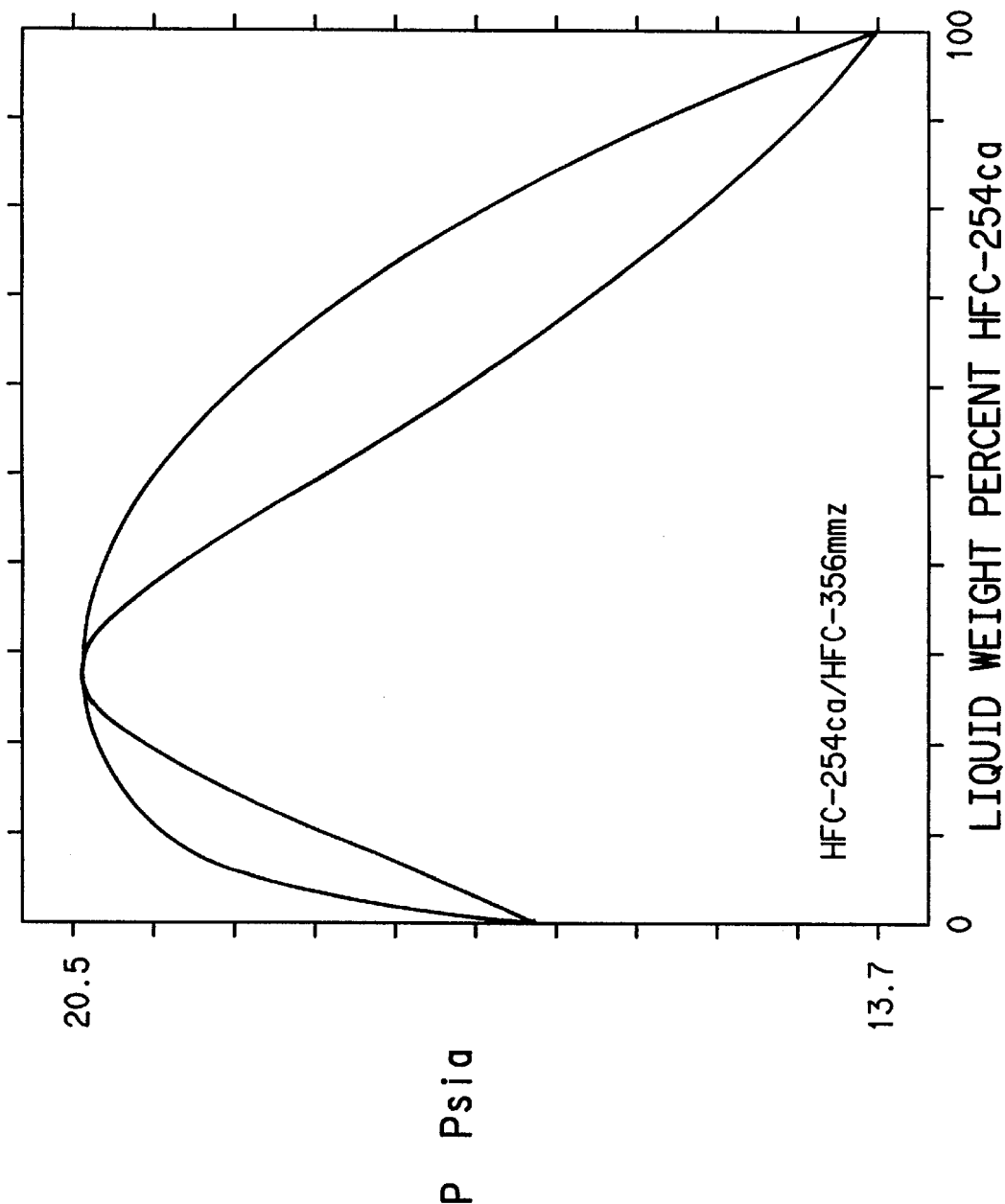
FIG. 3 is a graph of the vapor/liquid equilibrium curve for mixtures of HFC-254ca and HFC-356mmz at 25° C.
Figure 4:
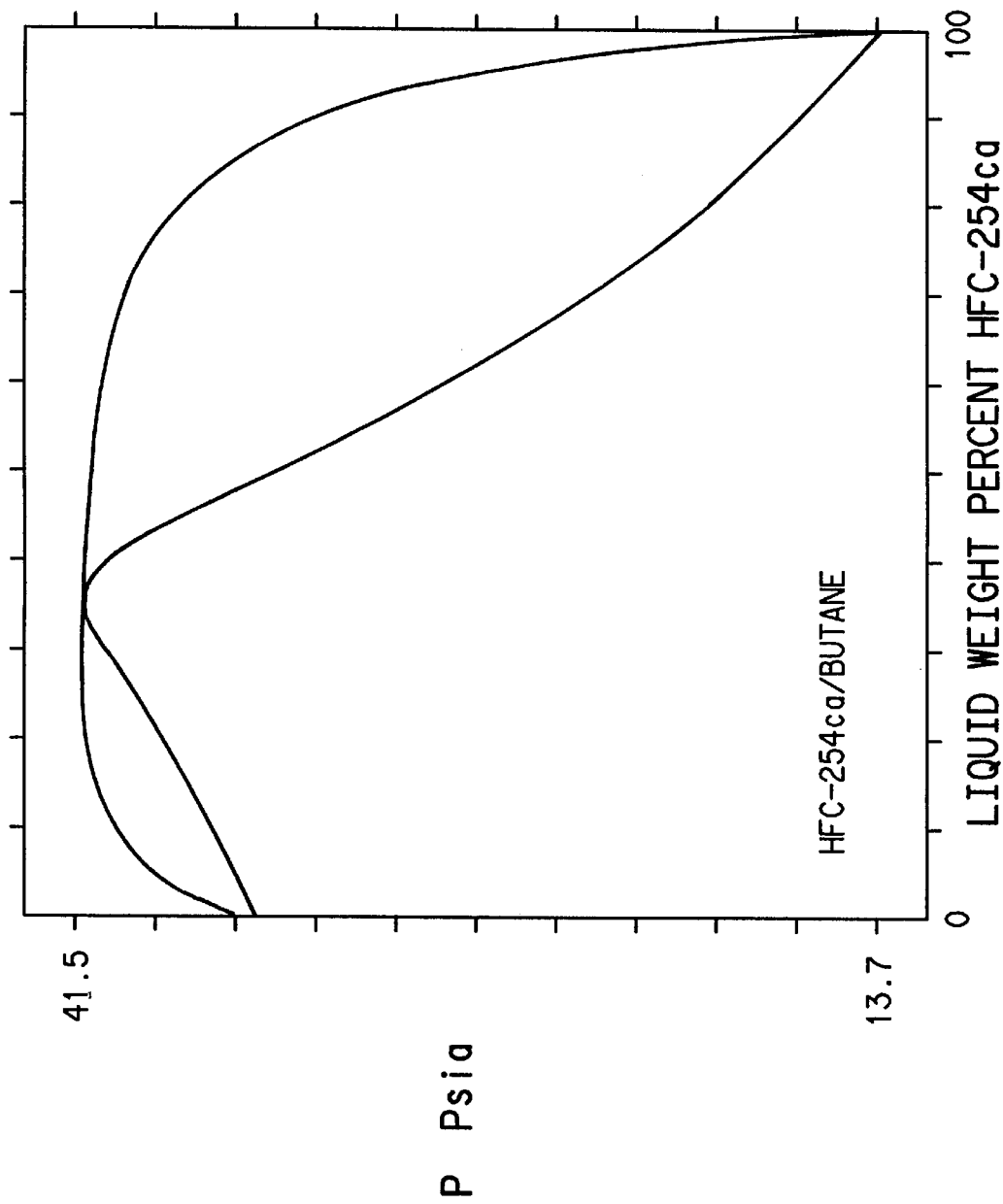
FIG. 4 is a graph of the vapor/liquid equilibrium curve for mixtures of HFC-254ca and HFC-butane at 25° C.
Figure 5:
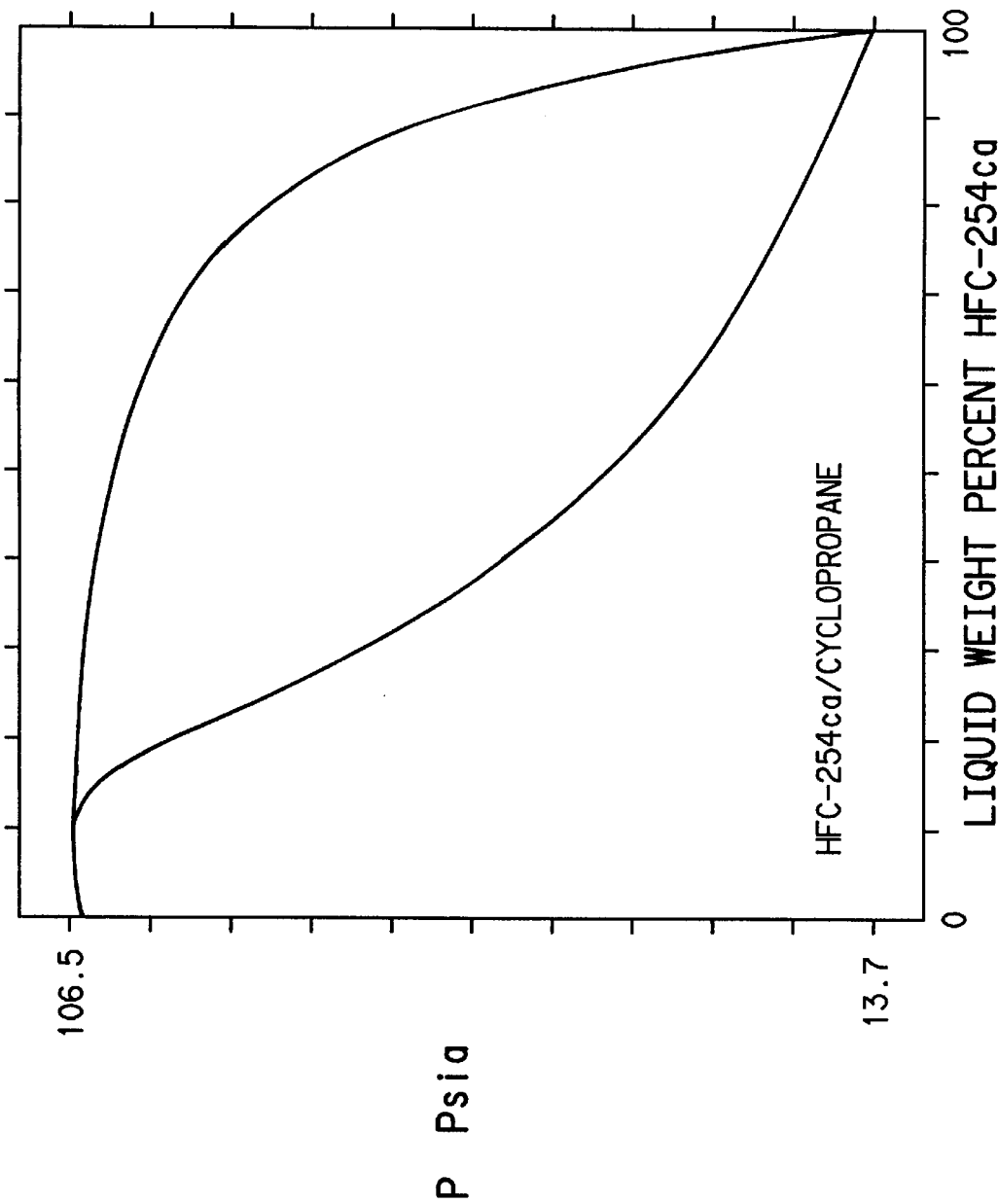
FIG. 5 is a graph of the vapor/liquid equilibrium curve for mixtures of HFC-254ca and cyclopropane at 25° C.
Figure 6:
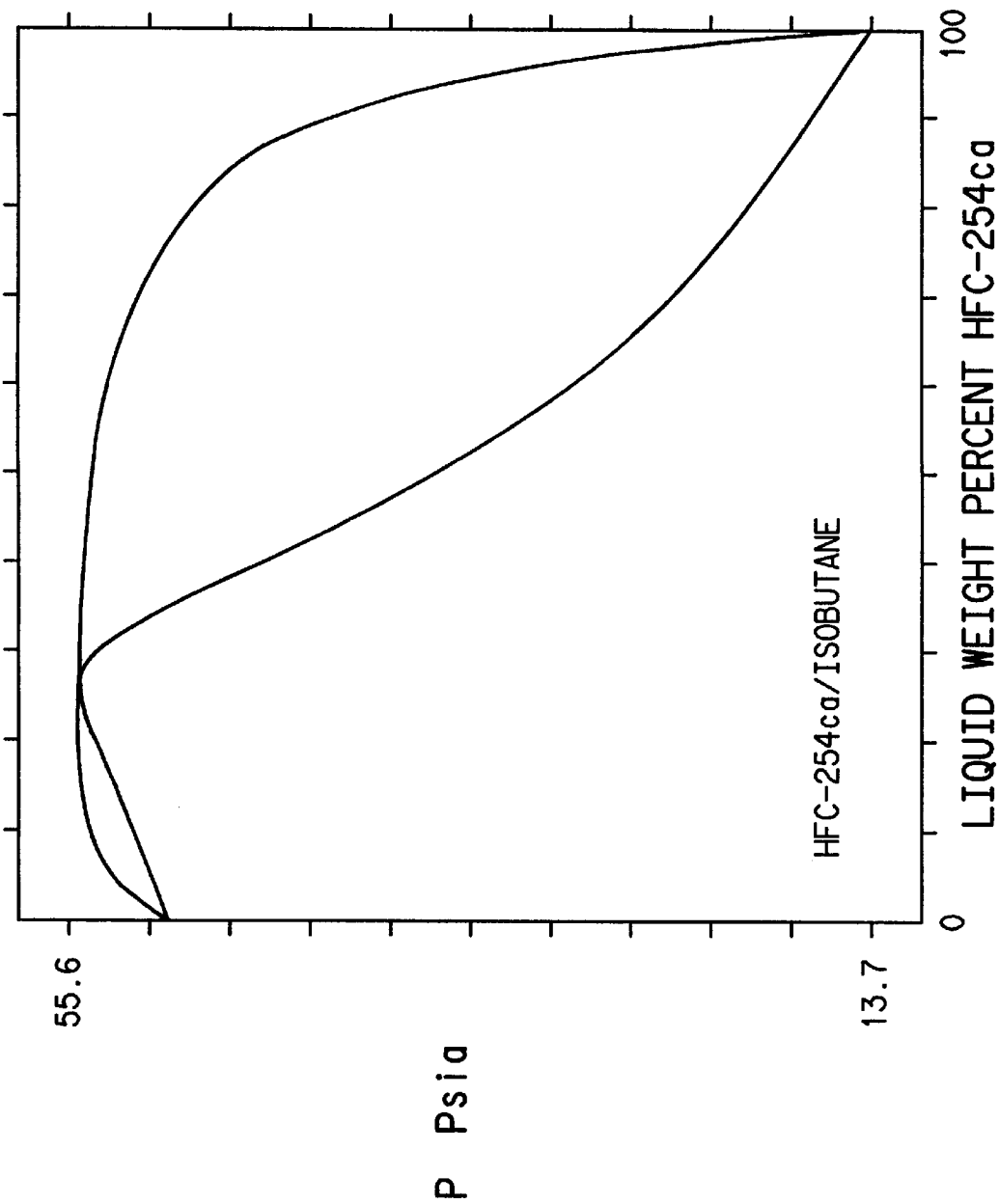
FIG. 6 is a graph of the vapor/liquid equilibrium curve for mixtures of HFC-254ca and isobutane at 25° C.
Figure 7:
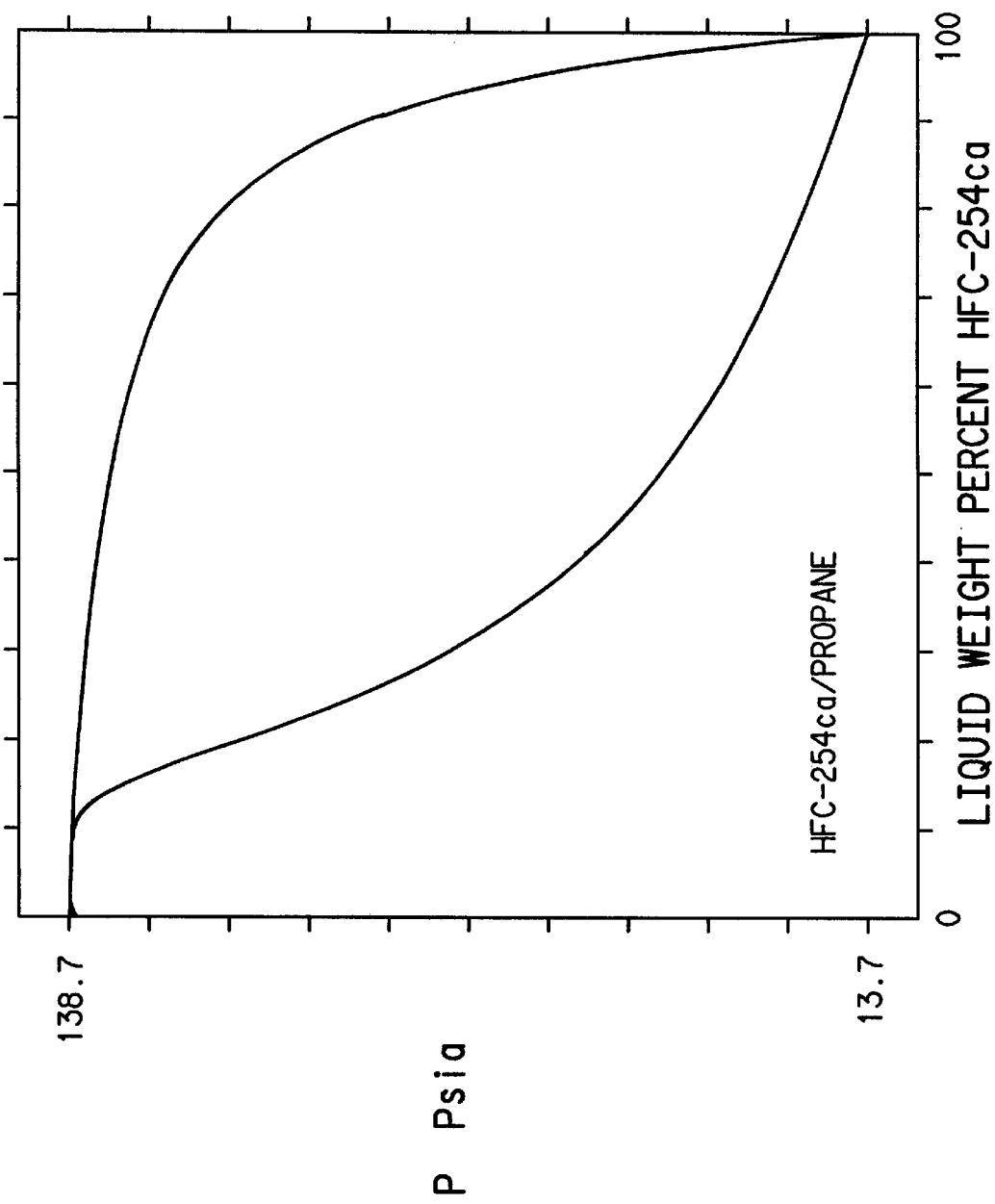
FIG. 7 is a graph of the vapor/liquid equilibrium curve for mixtures of HFC-254ca and propane at 25° C.

The present invention relates to the following compositions:

(a) 1,2,2,3-tetrafluoropropane (HFC-254ca) and 1,1,1-trifluoropropane (HFC-263fb); HFC-254ca and 2,2-difluoropropane (HFC-272ca); HFC-254ca and 1,1,1-trifluoro-2-trifluoromethyl propane (HFC-356 mmz); HFC-254ca and butane; HFC-254ca and cyclopropane; HFC-254ca and isobutane; or HFC-254ca and propane;

(b) 1,1,2,2-tetrafluoropropane (HFC-254cb) and 1,1,1,2-tetrafluoropropane (HFC-254eb); HFC-254cb and 2,2-difluoropropane (HFC-272ca); HFC-254cb and 1-fluoropropane (HFC-281fa); HFC-254cb and butane; HFC-254cb and cyclopropane; or HFC-254cb and isobutane;

(c) 1,1,1,2-tetrafluoropropane (HFC-254eb) and 2,2-difluoropropane (HFC-272ca); HFC-254eb and 1-fluoropropane (HFC-281fa); HFC-254eb and butane; HFC-254eb and cyclopropane; or HFC-254eb and isobutane;

(d) 1,2,2-trifluoropropane (HFC-263ca) and 1,1,1-trifluoro-2-trifluoromethyl propane (HFC-356 mmz); HFC-263ca and butane; or HFC-263ca and isobutane;

(e) 1,1,1-trifluoropropane (HFC-263fb) and 1,2-difluoropropane (HFC-272ea); HFC-263fb and 2-fluoropropane (HFC-281ea); HFC-263fb and 1-fluoropropane (HFC-281fa); HFC-263fb and dimethyl ether (DME); or HFC-263fb and isobutane;

(f) 2,2-difluoropropane (HFC-272ca) and 1,2-difluoropropane (HFC-272ea); HFC-272ca and 1-fluoropropane (HFC-281fa); or HFC-272ca and butane;

(g) 1,2-difluoropropane (HFC-272ea) and 1,1,1-trifluoro-2-trifluoromethyl propane (HFC-356 mmz); HFC-272ea and butane; HFC-272ea and cyclopropane; or HFC-272ea and isobutane;

(h) 1,1-difluoropropane (HFC-272fb) and butane;

(i) 2-fluoropropane (HFC-281ea) and butane; or HFC-281ea and isobutane; or (j) 1-fluoropropane (HFC-281fa) and butane; HFC-281fa and isobutane.

1–99 wt. % of each of the components of the compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents. Further, the present invention also relates to the discovery of azeotropic or azeotrope-like compositions of effective amounts of each of the above mixtures to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than about 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of:

(a) HFC-254ca and HFC-263fb; HFC-254ca and HFC-272ca; HFC-254ca and HFC-356 mmz; HFC-254ca and butane; HFC-254ca and cyclopropane; HFC-254ca and isobutane; or HFC-254ca and propane;

(b) HFC-254cb and HFC-254eb; HFC-254cb and HFC-272ca; HFC-254cb and HFC-281fa; HFC-254cb and butane; HFC-254cb and cyclopropane; or HFC-254cb and isobutane;

(c) HFC-254eb and HFC-272ca; HFC-254eb and HFC-281fa; HFC-254eb and butane; HFC-254eb and cyclopropane; or HFC-254eb and isobutane;

(d) HFC-263ca and HFC-356 mmz; HFC-263ca and butane; or HFC-263ca and isobutane;

(e) HFC-263fb and HFC-272ea; HFC-263fb and HFC-281ea; HFC-263fb and HFC-281fa; HFC-263fb and DME; or HFC-263fb and isobutane;

(f) HFC-272ca and HFC-272ea; HFC-272ca and HFC-281fa; or HFC-272ca and butane;

(g) HFC-272ea and HFC-356 mmz; HFC-272ea and butane; HFC-272ea and cyclopropane; or HFC-272ea and isobutane;

(h) HFC-272fb and butane;

(i) HFC-281ea and butane; or HFC-281ea and isobutane; or (j) HFC-281fa and butane; HFC-281fa and isobutane;

such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at the temperature specified.

| COMPONENTS | 25° C. PSIA | 25° C. KPA | −9.95° C. PSIA | −9.95° C. KPA |
|---|---|---|---|---|
| HFC-254ca | 13.7 | 94 | | |
| HFC-254cb | 34.2 | 236 | | |
| HFC-254eb | 34.8 | 240 | | |
| HFC-263ca | 18.2 | 125 | | |
| HFC-263fb | 54.0 | 372 | | |
| HFC-272ca | 34.5 | 238 | | |
| HFC-272ea | 20.8 | 143 | | |
| HFC-272fb | 26.5 | 183 | | |
| HFC-281ea | 47.1 | 325 | 14.2 | 98 |
| HFC-281fa | 37.7 | 260 | | |
| HFC-356mmz | 16.6 | 114 | | |
| butane | 35.2 | 243 | 10.2 | 70 |
| cyclopropane | 105.0 | 724 | | |
| isobutane | 50.5 | 348 | 15.8 | 109 |
| propane | 137.8 | 950 | | |
| DME | 85.7 | 591 | | |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt. %) |
|---|---|---|
| HFC-254ca/HFC-263fb | 1–36/64–99 | 1–36/64–99 |
| HFC-254ca/HFC-272ca | 1–52/48–99 | 1–52/48–99 |
| HFC-254ca/HFC-356mmz | 1–79/21–99 | 1–79/21–99 |
| HFC-254ca/butane | 1–65/35–99 | 1–65/35–99 |
| HFC-254ca/cyclopropane | 1–51/49–99 | 1–51/49–99 |
| HFC-254ca/isobutane | 1–60/40–99 | 1–60/40–99 |
| HFC-254ca/propane | 1–53/47–99 | 1–53/47–99 |
| HFC-254cb/HFC-254eb | 1–99/1–99 | 20–80/20–80 |
| HFC-254cb/HFC-272ca | 1–99/1–99 | 20–80/20–80 |
| HFC-254cb/HFC-281fa | 1–99/1–99 | 1–60/40–99 |
| HFC-254cb/butane | 1–99/1–99 | 40–99/1–60 |
| HFC-254cb/cyclopropane | 1–60/40–99 | 1–60/40–99 |
| HFC-254cb/isobutane | 1–80/20–99 | 1–80/20–99 |
| HFC-254eb/HFC-272ca | 1–99/1–99 | 20–80/20–80 |
| HFC-254eb/HFC-281fa | 1–99/1–99 | 20–99/1–80 |
| HFC-254eb/butane | 1–99/1–99 | 20–99/1–80 |
| HFC-254eb/cyclopropane | 1–59/41–99 | 1–59/41–99 |
| HFC-254eb/isobutane | 1–82/18–99 | 1–82/18–99 |
| HFC-263ca/HFC-356mmz | 1–99/1–99 | 20–80/20–80 |
| HFC-263ca/butane | 1–67/33–99 | 1–67/33–99 |
| HFC-263ca/isobutane | 1–56/44–99 | 1–56/44–99 |
| HFC-263fb/HFC-272ea | 66–99/1–34 | 66–99/1–34 |
| HFC-263fb/HFC-281ea | 1–99/1–99 | 40–99/1–60 |
| HFC-263fb/HFC-281fa | 1–99/1–99 | 40–99/1–60 |
| HFC-263fb/DME | 1–83/17–99 | 1–83/17–99 |
| HFC-263fb/isobutane | 1–99/1–99 | 40–99/1–60 |
| HFC-272ca/HFC-272ea | 41–99/1–59 | 41–99/1–59 |
| HFC-272ca/HFC-281fa | 1–99/1–99 | 20–80/20–80 |

-continued

| COMPONENTS | WEIGHT RANGES (wt. %/wt/%) | PREFERRED (wt. %/wt. %) |
|---|---|---|
| HFC-272ca/butane | 1–99/1–99 | 40–99/1–60 |
| HFC-272ea/HFC-356mmz | 10–99/1–90 | 20–80/20–80 |
| HFC-272ea/butane | 1–64/36–99 | 1–64/36–99 |
| HFC-272ea/cyclopropane | 1–42/58–99 | 1–42/58–99 |
| HFC-272ea/isobutane | 1–55/45–99 | 1–55/45–99 |
| HFC-272fb/butane | 1–99/1–99 | 20–99/1–80 |
| HFC-281ea/butane | 1–99/1–99 | 20–99/1–80 |
| HFC-281ea/isobutane | 1–99/1–99 | 20–99/1–80 |
| HFC-281fa/butane | 1–99/1–99 | 20–99/1–80 |
| HFC-281fa/isobutane | 1–99/1–99 | 10–99/1–90 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following compositions are azeotropic, all at 25° C.

| Composition No. | | Vapor Press. psia (kPa) | |
|---|---|---|---|
| HFC-254ca/HFC-263fb | 5.0/95.0 | 54.4 | 375 |
| HFC-254ca/HFC-272ca | 18.1/81.9 | 36.5 | 252 |
| HFC-254ca/HFC-356mmz | 26.5/73.5 | 20.5 | 141 |
| HFC-254ca/butane | 34.4/65.6 | 41.5 | 286 |
| HFC-254ca/cyclopropane | 9.3/90.7 | 106.5 | 734 |
| HFC-254ca/isobutane | 25.5/74.5 | 55.6 | 383 |
| HFC-254ca/propane | 6.6/93.4 | 138.7 | 956 |
| HFC-254cb/HFC-254eb | 55.5/44.5 | 30.3 | 209 |
| HFC-254cb/HFC-272ca | 55.2/44.8 | 37.6 | 259 |
| HFC-254cb/HFC-281fa | 17.2/82.8 | 38.0 | 262 |
| HFC-254cb/butane | 63.0/37.0 | 45.6 | 314 |
| HFC-254cb/cyclopropane | 8.1/91.9 | 105.3 | 726 |
| HFC-254cb/isobutane | 46.2/53.8 | 57.0 | 393 |
| HFC-254eb/HFC-272ca | 54.9/45.1 | 38.1 | 263 |
| HFC-254eb/HFC-281fa | 39.2/60.8 | 38.2 | 263 |
| HFC-254eb/butane | 62.9/37.1 | 44.8 | 309 |
| HFC-254eb/cyclopropane | 5.5/94.5 | 105.2 | 725 |
| HFC-254eb/isobutane | 44.7/55.3 | 56.2 | 387 |
| HFC-263ca/HFC-356mmz | 42.3/57.7 | 19.8 | 137 |
| HFC-263ca/butane | 26.4/73.6 | 36.9 | 254 |
| HFC-263ca/isobutane | 8.6/91.4 | 50.7 | 350 |
| HFC-263fb/HFC-272ea | 94.2/5.8 | 54.8 | 378 |
| HFC-263fb/HFC-281ea | 79.3/20.7 | 56.6 | 390 |
| HFC-263fb/HFC-281fa | 89.8/10.2 | 55.2 | 381 |
| HFC-263fb/DME | 42.4/57.6 | 90.2 | 622 |
| HFC-263fb/isobutane | 69.1/30.9 | 58.3 | 402 |
| HFC-272ca/HFC-272ea | 81.7/18.3 | 37.0 | 255 |
| HFC-272ca/HFC-281fa | 52.2/47.8 | 40.2 | 277 |
| HFC-272ca/butane | 53.6/46.4 | 36.9 | 254 |
| HFC-272ea/HFC-356mmz | 36.6/63.4 | 24.0 | 165 |
| HFC-272ea/butane | 32.2/67.8 | 40.6 | 280 |
| HFC-272ea/cyclopropane | 3.8/96.2 | 105.3 | 726 |
| HFC-272ea/isobutane | 20.9/79.1 | 54.0 | 372 |
| HFC-272fb/butane | 33.0/67.0 | 36.9 | 254 |
| HFC-281fa/butane | 53.8/46.2 | 42.6 | 294 |
| HFC-281fa/isobutane | 26.4/73.6 | 53.2 | 367 |

A phase study showed the following compositions are azeotropic at −9.95° C.:

| | | | |
|---|---|---|---|
| HFC-281ea/butane | 72.9/29.1 | 15.2 | 105 |
| HFC-281ea/isobutane | 44.7/55.3 | 18.1 | 125 |

EXAMPLE 2

Impact of Vapor Leakage on Vapor Pressure at 25° C.

A vessel is charged with an initial composition at 25° C., and the vapor pressure of the composition is measured. The composition is allowed to leak from the vessel, while the temperature is held constant at 25° C., until 50 weight percent of the initial composition is removed, at which time the vapor pressure of the composition remaining in the vessel is measured. The results are summarized below.

| Refrigerant Composition | 0 wt % evaporated psia (kPa) | | 50 wt % evaporated psia (kPa) | | 0% change in vapor pressure |
|---|---|---|---|---|---|
| HFC-254ca/HFC-263fb | | | | | |
| 5.0/95.0 | 54.4 | 375 | 54.4 | 375 | 0.0 |
| 1/99 | 54.2 | 374 | 54.1 | 373 | 0.2 |
| 36/64 | 50.9 | 351 | 46.0 | 317 | 9.6 |
| 37/63 | 50.7 | 350 | 45.5 | 314 | 10.3 |
| HFC-254ca/HFC-272ca | | | | | |
| 18.1/81.9 | 36.5 | 252 | 36.5 | 252 | 0.0 |
| 1/99 | 34.9 | 241 | 34.6 | 239 | 0.9 |
| 40/60 | 35.7 | 246 | 34.5 | 238 | 3.4 |
| 50/50 | 34.7 | 239 | 31.8 | 219 | 8.4 |
| 52/48 | 34.5 | 238 | 31.1 | 214 | 9.9 |
| HFC-254ca/HFC-356mmz | | | | | |
| 26.5/73.5 | 20.5 | 141 | 20.5 | 141 | 0.0 |
| 10/90 | 19.9 | 137 | 18.9 | 130 | 5.0 |
| 1/99 | 17.4 | 120 | 16.7 | 115 | 4.0 |
| 50/50 | 19.8 | 137 | 19.0 | 131 | 4.0 |
| 70/30 | 18.1 | 125 | 16.4 | 113 | 9.4 |
| 79/21 | 17.0 | 117 | 15.3 | 105 | 10.0 |
| HFC-254ca/butane | | | | | |
| 34.4/65.6 | 41.5 | 286 | 41.5 | 286 | 0.0 |
| 20/80 | 41.3 | 285 | 40.1 | 276 | 2.9 |
| 13/87 | 40.8 | 281 | 36.9 | 254 | 9.6 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 50° C.

A leak test is performed on compositions of HFC-272ca and HFC-272ea, at the temperature of 50° C. The results are summarized below.

| Refrigerant Composition HFC-272ca and HFC-272ea | 0 wt % evaporated psia (kPa) | | 50 wt % evaporated psia (kPa) | | 0% change in vapor pressure |
|---|---|---|---|---|---|
| 80.0/20.0 | 75.4 | 592 | 75.4 | 592 | 0.0 |
| 99/1 | 71.0 | 490 | 70.5 | 486 | 0.7 |
| 60/40 | 73.5 | 507 | 71.8 | 495 | 2.3 |
| 40/60 | 68.1 | 470 | 62.6 | 432 | 8.1 |
| 34/66 | 65.8 | 454 | 59.3 | 409 | 9.9 |
| 33/67 | 65.4 | 451 | 58.7 | 405 | 10.2 |

These results show that compositions of HFC-272ca and HFC-272ea are azeotropic or azeotrope-like at different temperatures, but that the weight percents of the components vary as the temperature is changed.

EXAMPLE 4

Refrigerant Performance

The following table shows the performance of various refrigerants. The data are based on the following conditions.

| | |
|---|---|
| Evaporator temperature | 45° F. (7.0° C.) |
| Condenser temperature | 130° F. (54.0° C.) |
| Return gas temperature | 65° F. (18.0° C.) |
| Subcool temperature | 15° F. (−9.0° C.) |
| Compressor efficiency is | 75% |

| Refrig. Comp. HFC-254ca/ HFC-263fb | Evap. Press. Psia (kPa) | | Cond. Press. Psia (kPa) | | Comp. Dis. Temp. ° F. (° C.) | | COP | Capacity BTU/min (kw) | |
|---|---|---|---|---|---|---|---|---|---|
| 1/99 | 30.0 | 207 | 119.0 | 820 | 155.0 | 68.3 | 3.53 | 127.7 | 2.2 |
| 99/1 | 6.9 | 48 | 35.9 | 248 | 161.3 | 71.8 | 3.79 | 39.0 | 0.7 |

EXAMPLE 5

This Example is directed to measurements of the liquid/vapor equilibrium curves for the mixtures in FIGS. 1–38.

Turning to FIG. 1, the upper curve represents the composition of the liquid, and the lower curve represents the composition of the vapor.

The data for the compositions of the liquid in FIG. 1 are obtained as follows. A stainless steel cylinder is evacuated, and a weighed amount of HFC-254ca is added to the cylinder. The cylinder is cooled to reduce the vapor pressure of HFC-254ca, and then a weighed amount of HFC-263fb is added to the cylinder. The cylinder is agitated to mix the HFC-254ca and HFC-263fb, and then the cylinder is placed in a constant temperature bath until the temperature comes to equilibrium at 25° C., at which time the vapor pressure of the HFC-254ca and HFC-263fb in the cylinder is measured. Additional samples of liquid are measured the same way, and the results are plotted in FIG. 1.

The curve which shows the composition of the vapor is calculated using an ideal gas equation of state.

Vapor/liquid equilibrium data are obtained in the same way for the mixtures shown in FIGS. 2–38.

The data in FIGS. 1–7, 9–34 show that at 25° C., there are ranges of compositions that have vapor pressures higher than the vapor pressures of the pure components of the composition at that same temperature. As stated earlier, the higher than expected pressures of these compositions may result in an unexpected increase in the refrigeration capacity and efficiency for these compositions versus the pure components of the compositions.

Figure 35:
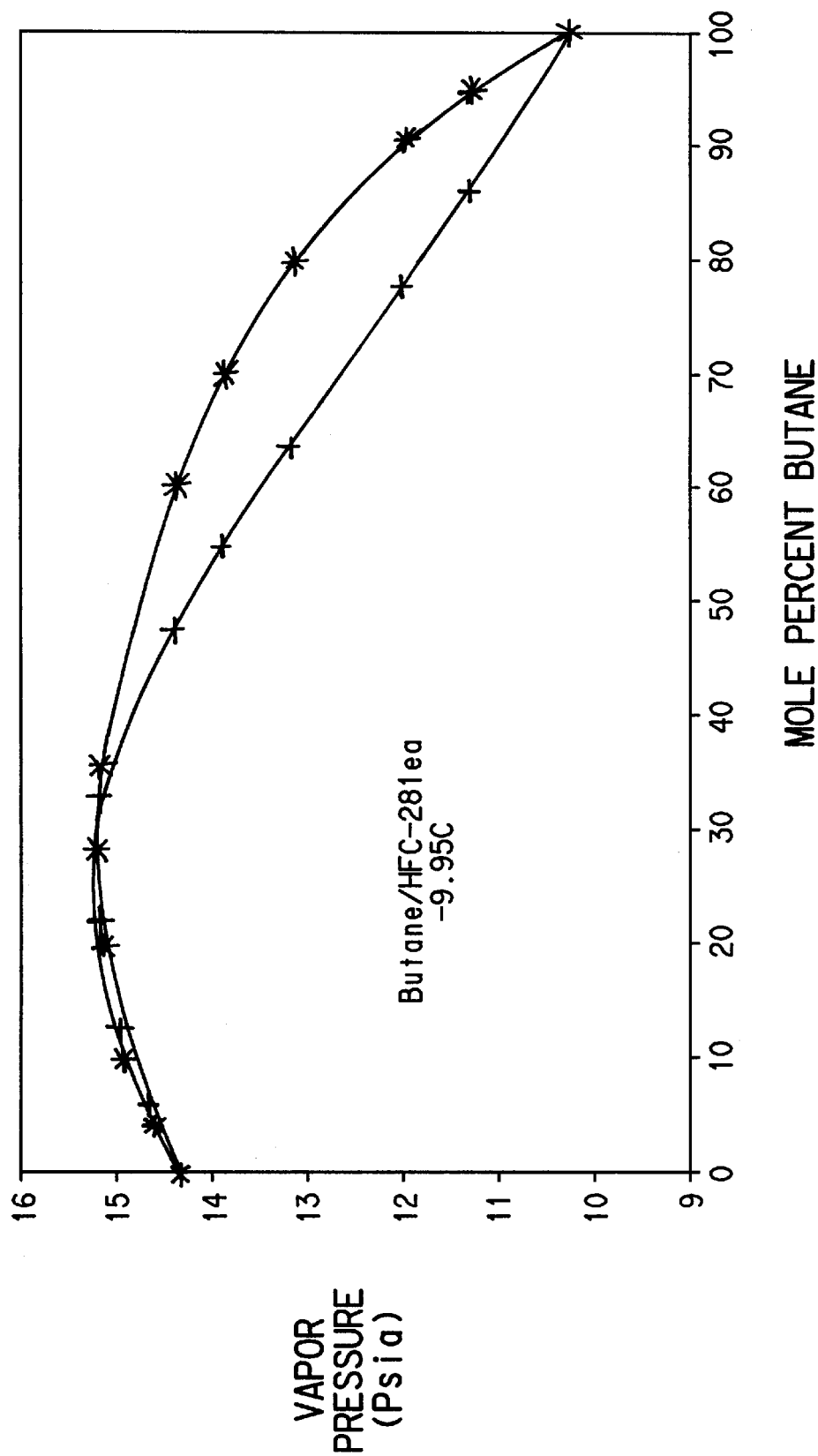
FIG. 35 is a graph of the vapor/liquid equilibrium curve for mixtures of HFC-281ea and butane −9.95° C.
Figure 36:
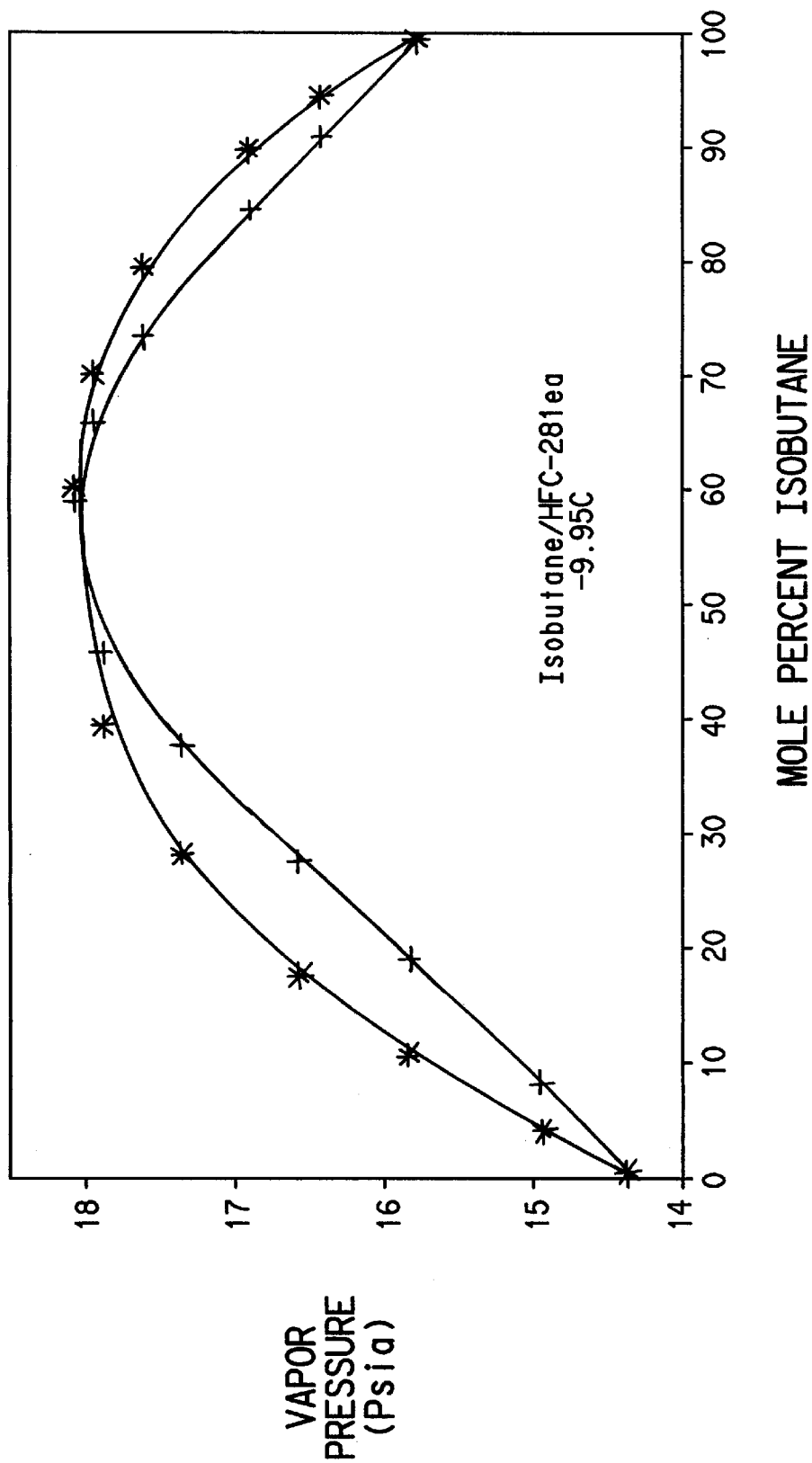
FIG. 36 is a graph of the vapor/liquid equilibrium curve for mixtures of HFC-281ea and isobutane −9.95° C.
Figure 37:
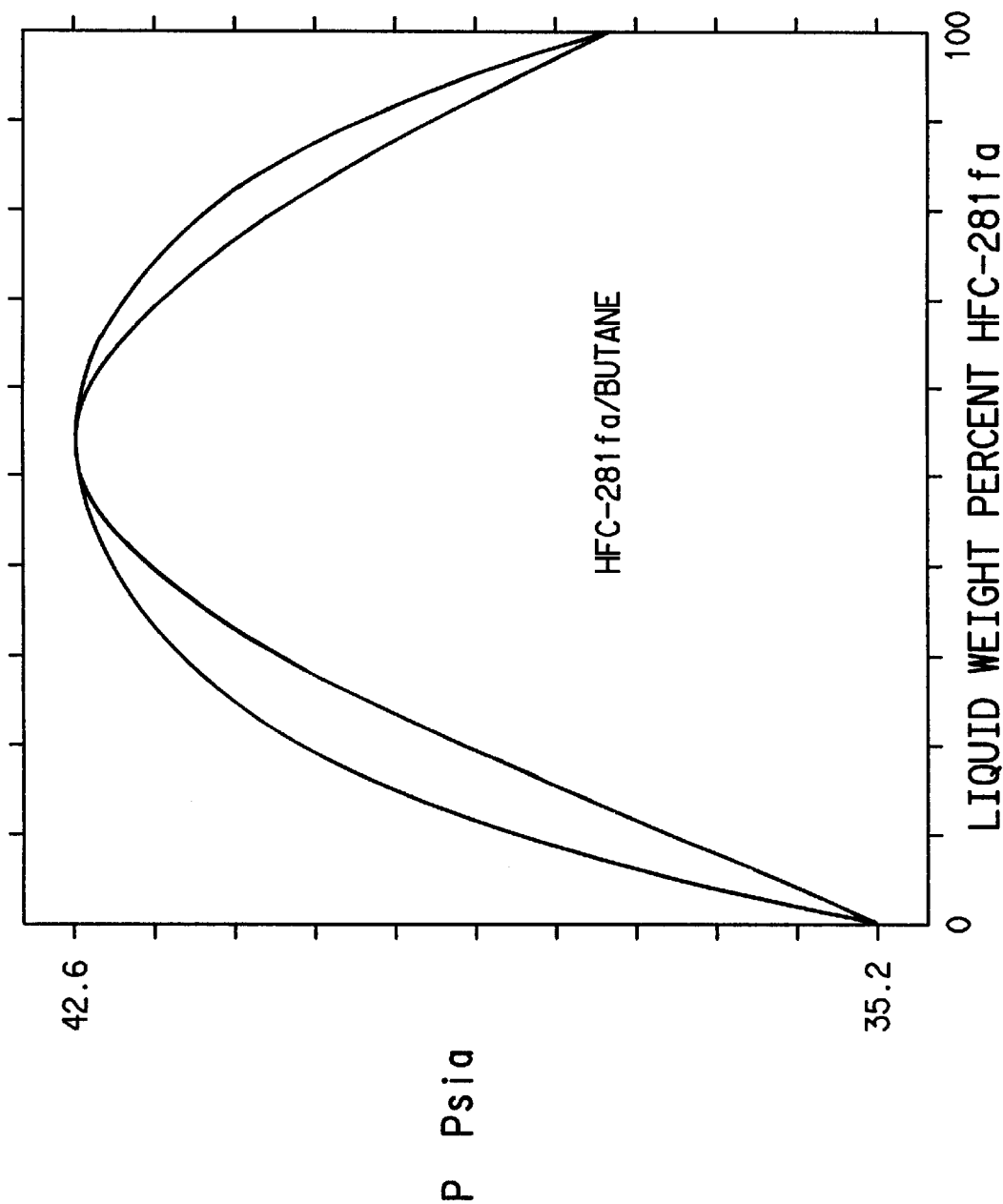
FIG. 37 is a graph of the vapor/liquid equilibrium curve for mixtures of HFC-281fa and butane.
Figure 38:
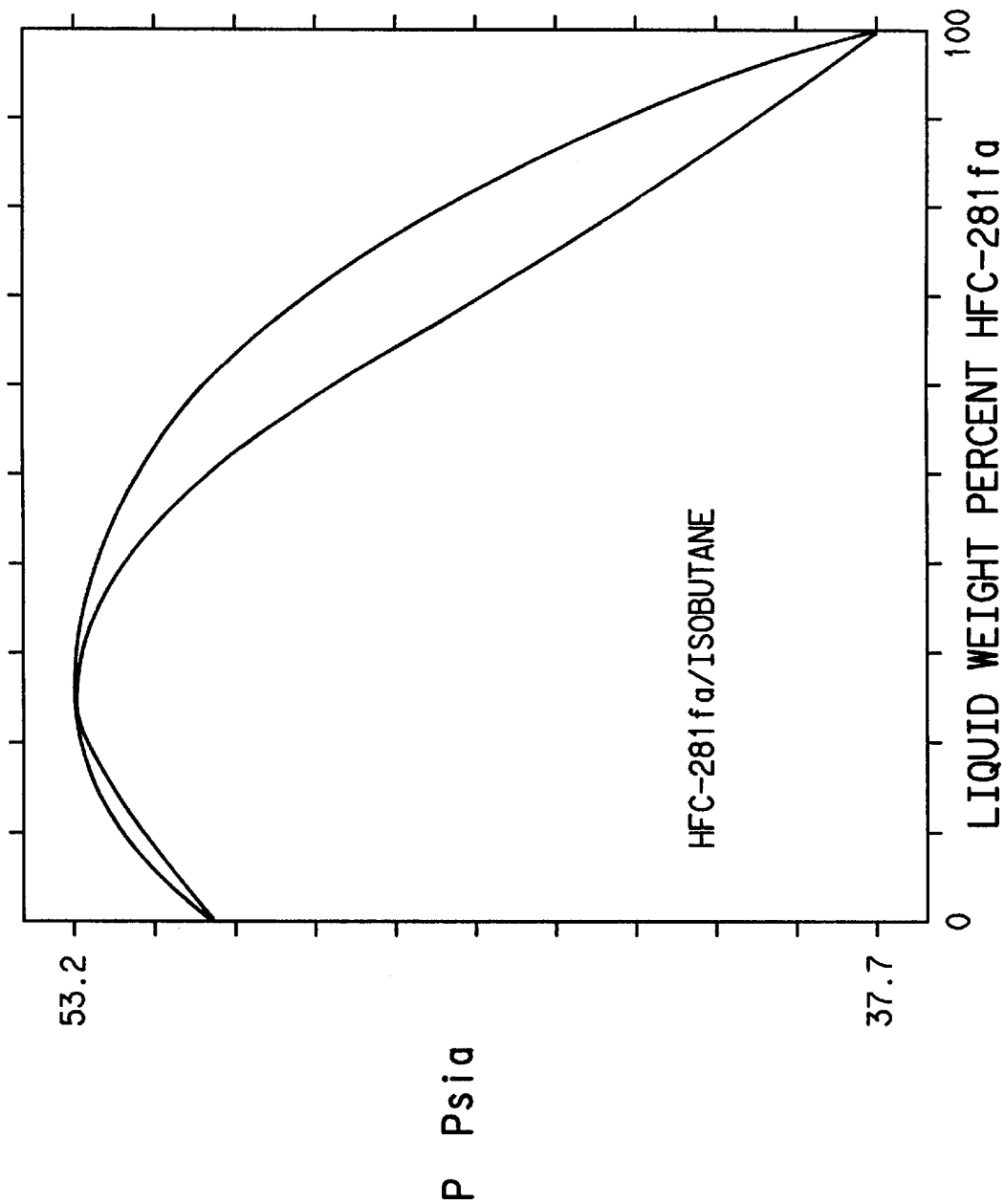
FIG. 38 is a graph of the vapor/liquid equilibrium curve for mixtures of HFC-281fa and isobutane.

The data in FIGS. 35 and 36 show that at −9.95° C. there are ranges of compositions that have vapor pressures higher than the vapor pressures of the pure components of the composition at that same temperature.

Figure 8:
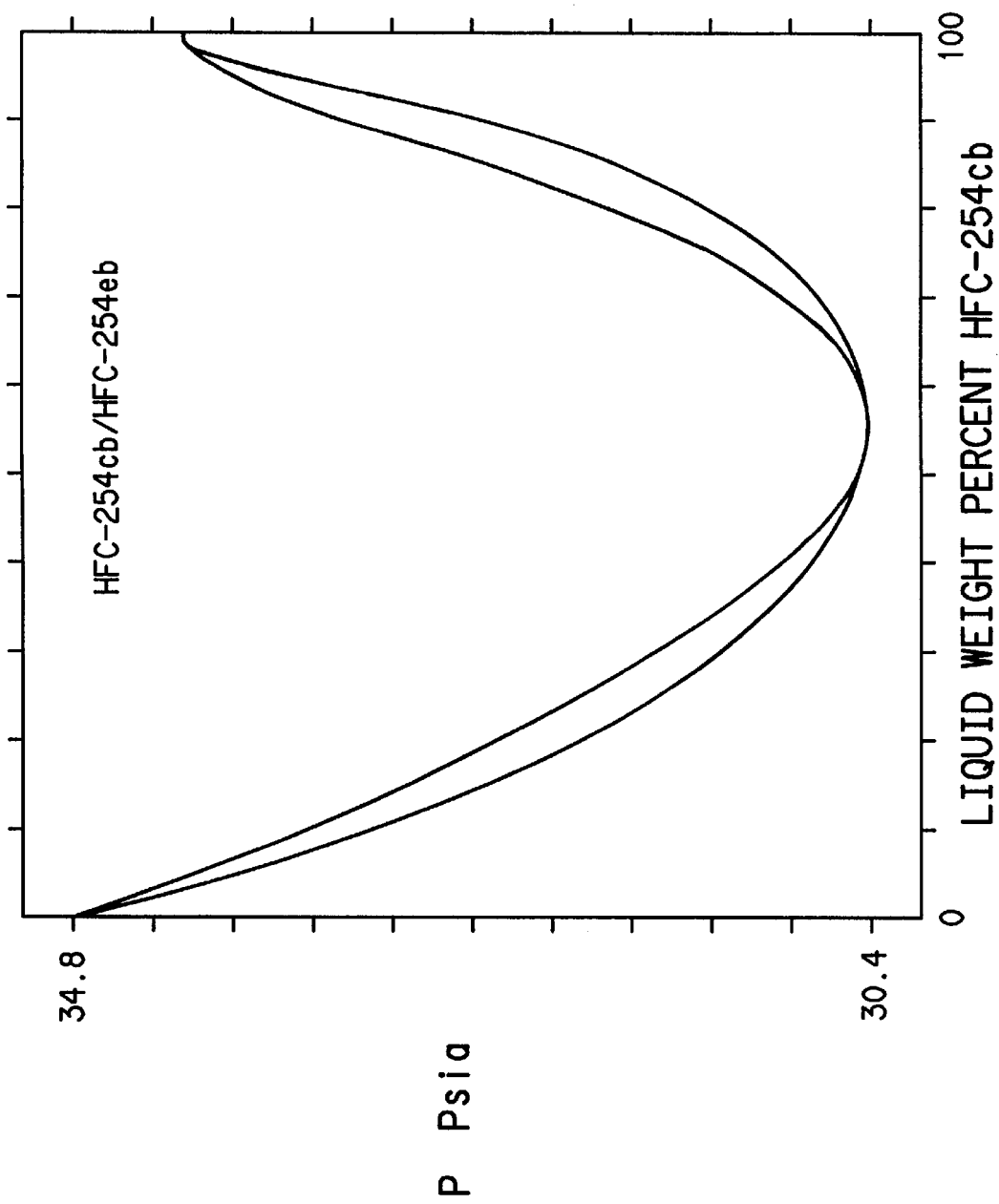
FIG. 8 is a graph of the vapor/liquid equilibrium curve for mixtures of HFC-254cb and 254eb at 25° C.
Figure 9:
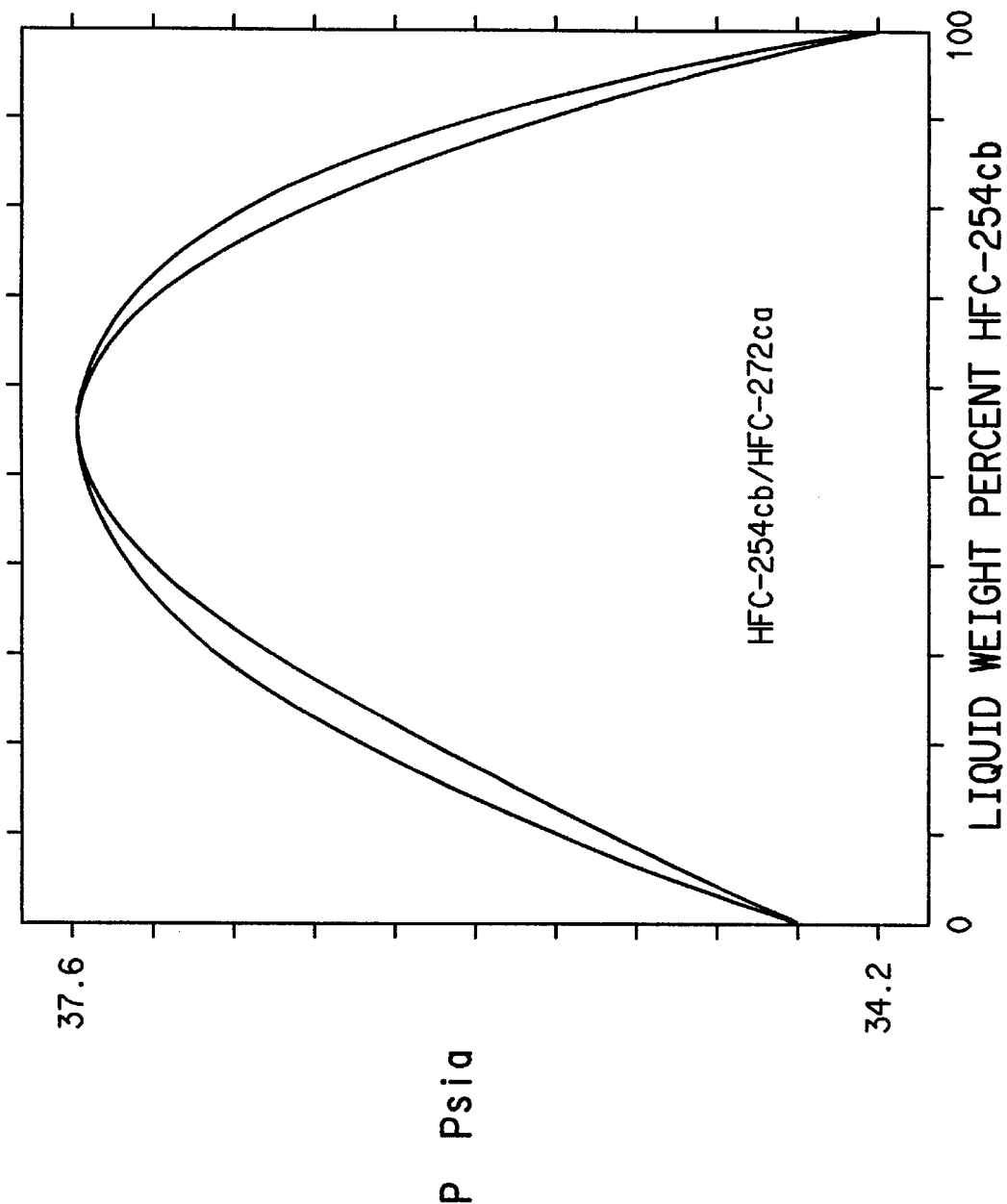
FIG. 9 is a graph of the vapor/liquid equilibrium curve for mixtures of HFC-254cb and HFC-272ca at 25° C.
Figure 10:
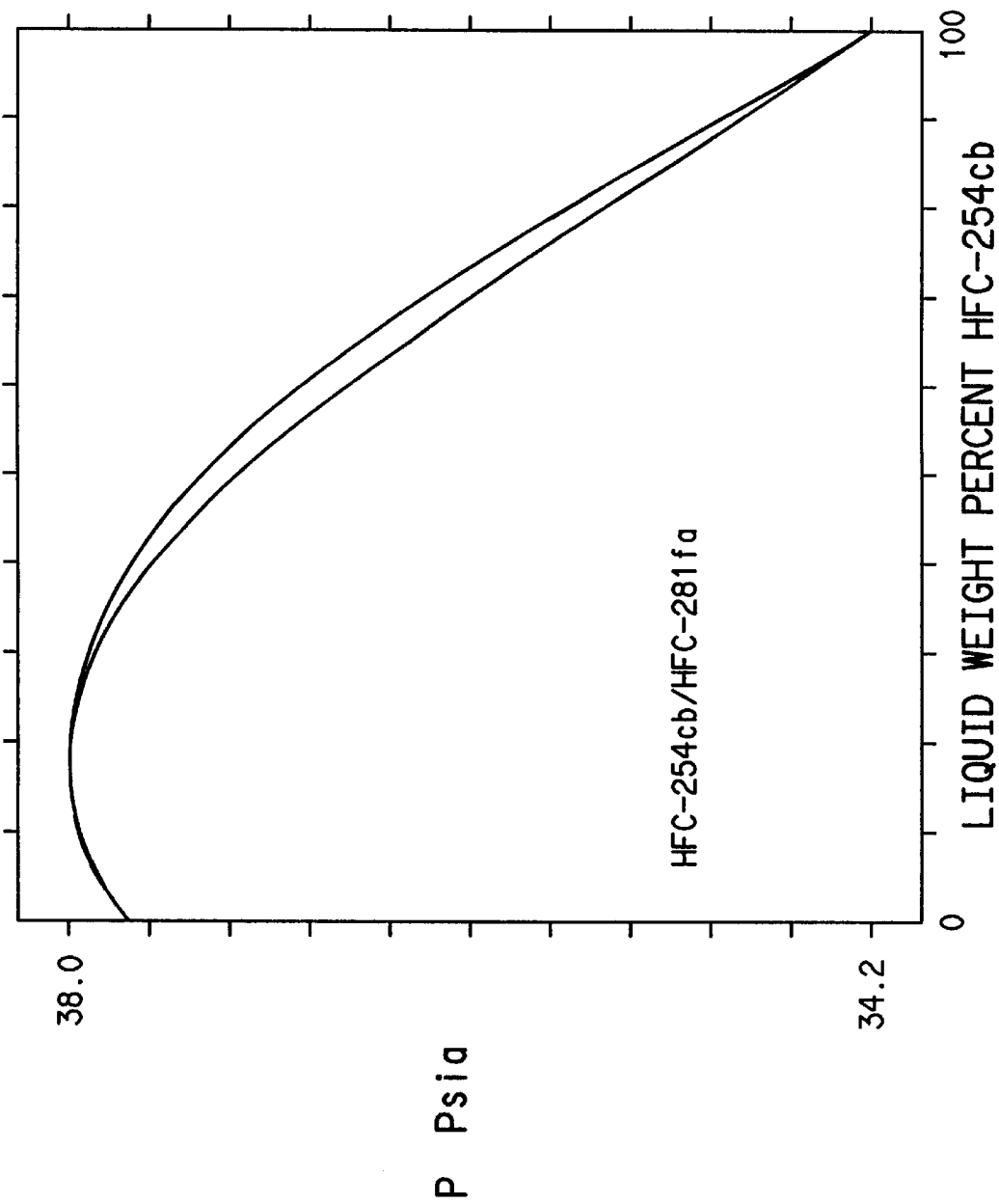
FIG. 10 is a graph of the vapor/liquid equilibrium curve for mixtures of HFC-254cb and HFC-281fa at 25° C.
Figure 11:
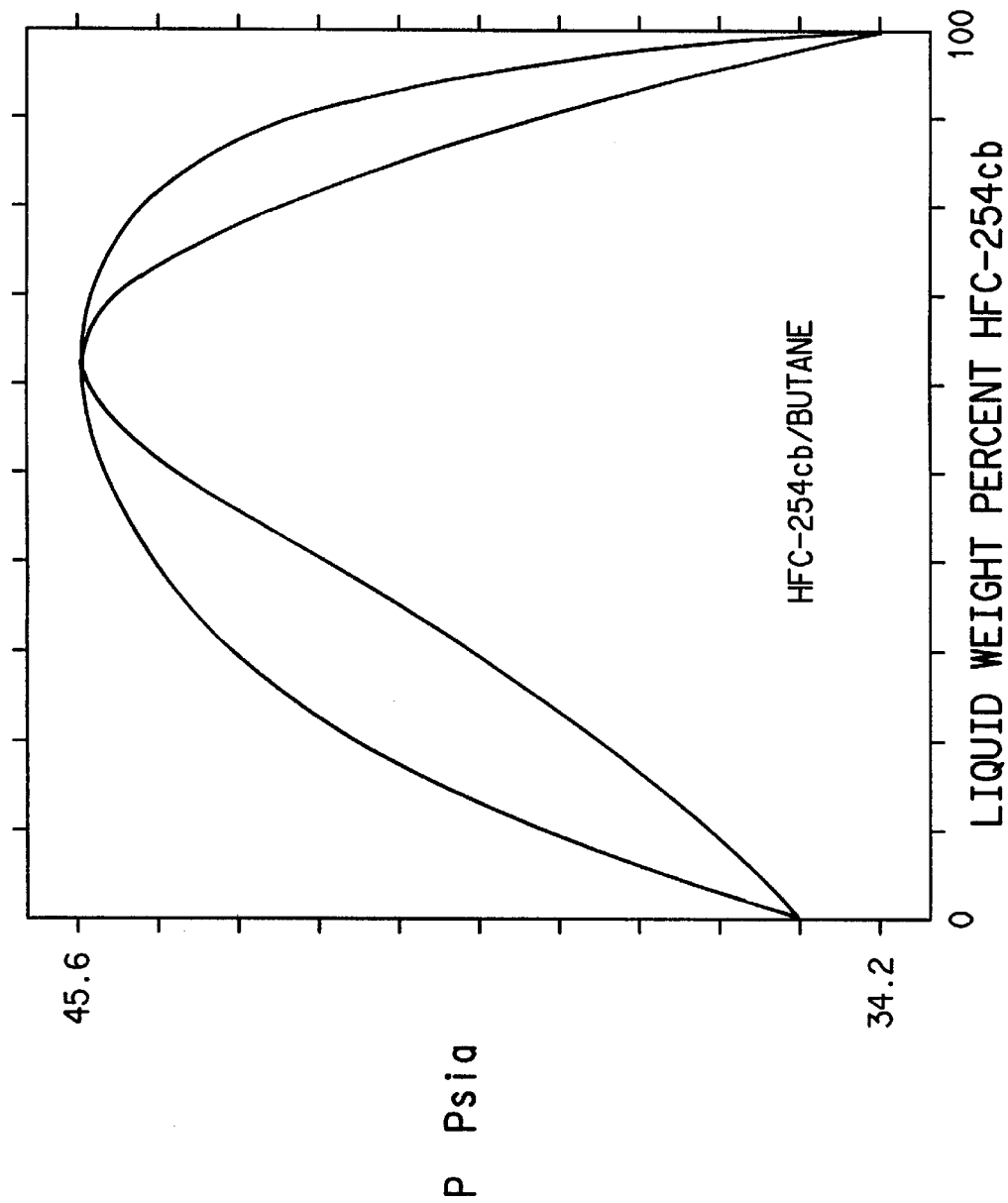
FIG. 11 is a graph of the vapor/liquid equilibrium curve for mixtures of HFC-254cb and butane at 25° C.
Figure 12:
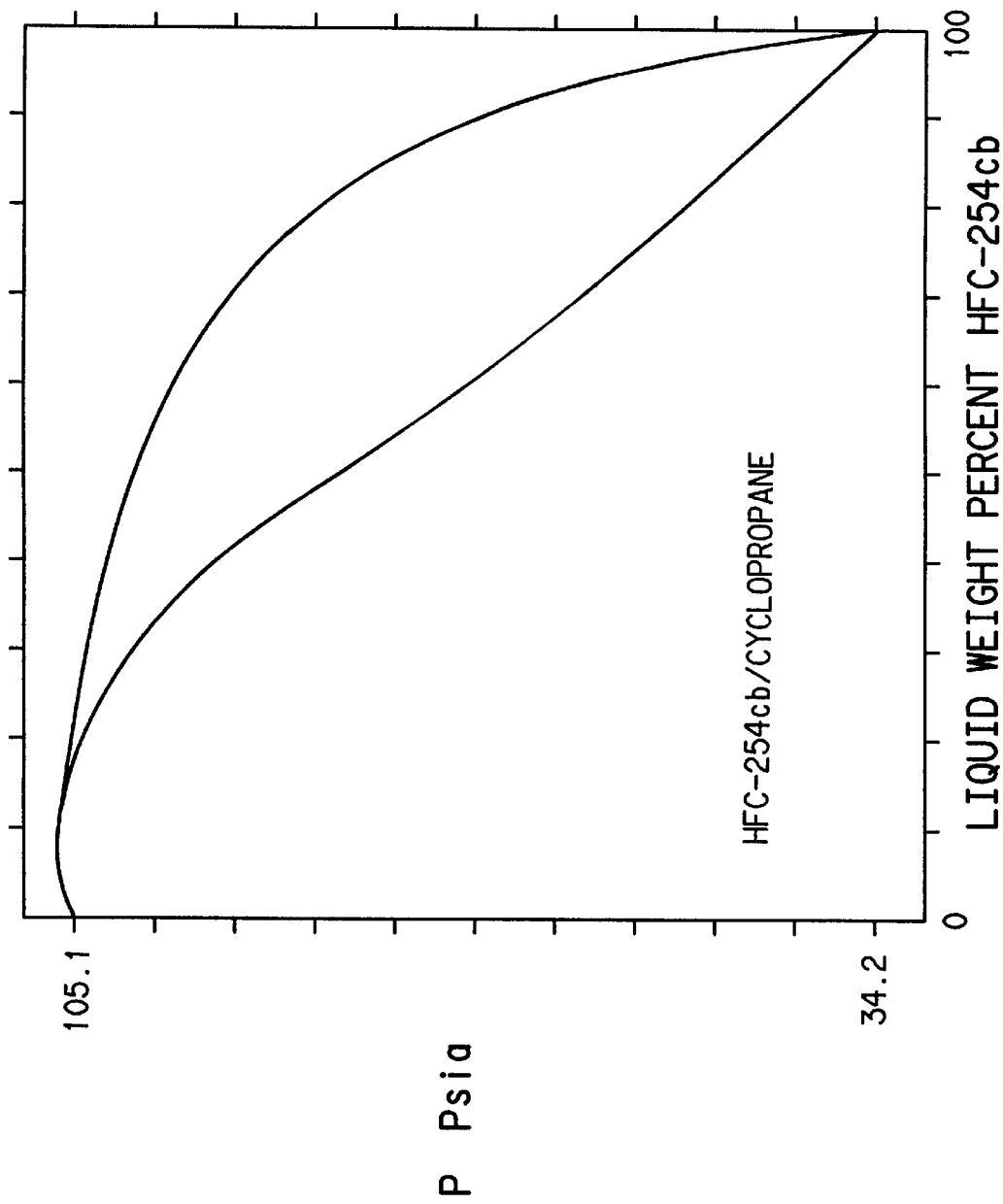
FIG. 12 is a graph of the vapor/liquid equilibrium curve for mixtures of HFC-254cb and cyclopropane at 25° C.
Figure 13:
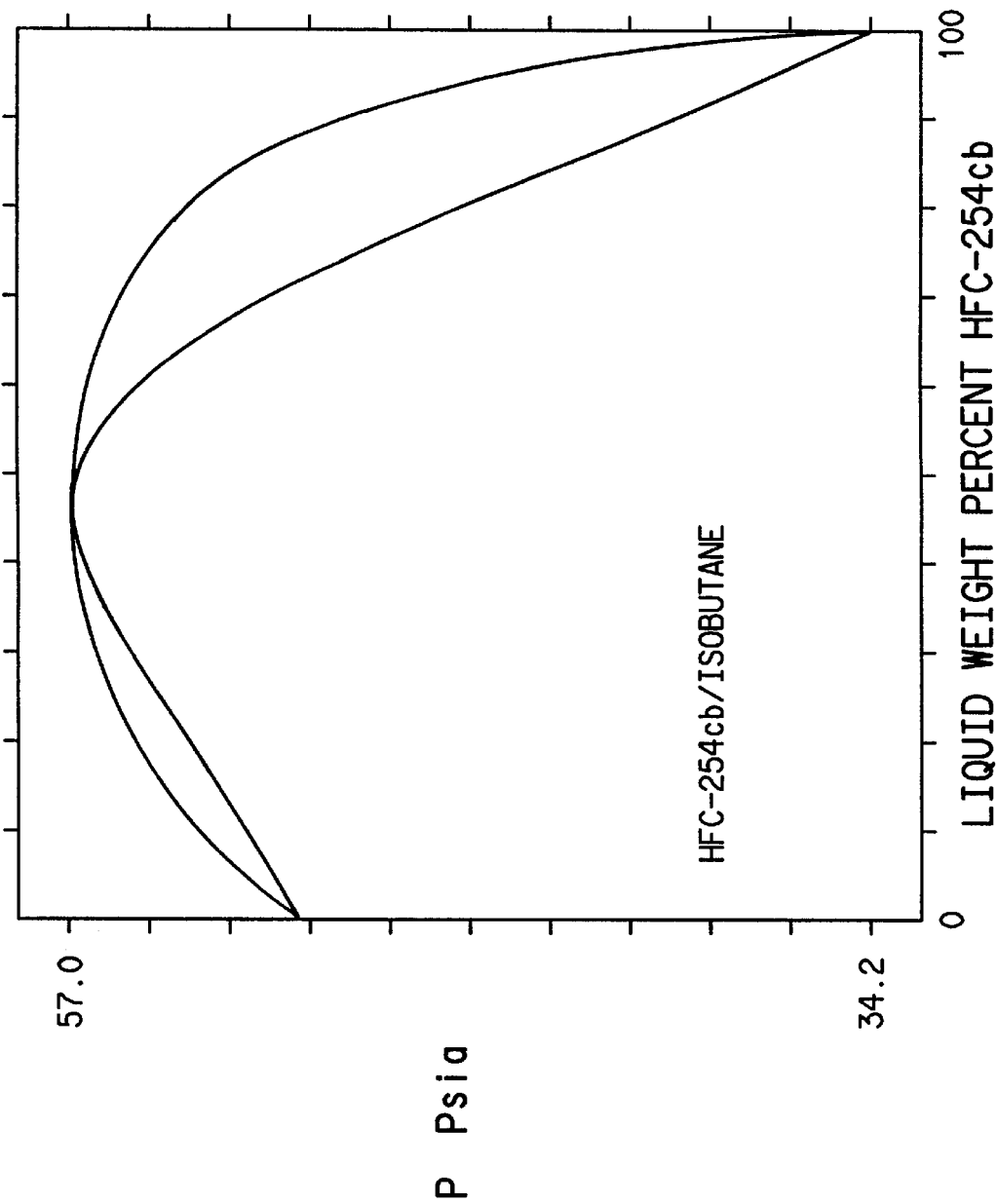
FIG. 13 is a graph of the vapor/liquid equilibrium curve for mixtures of HFC-254cb and isobutane at 25° C.
Figure 14:
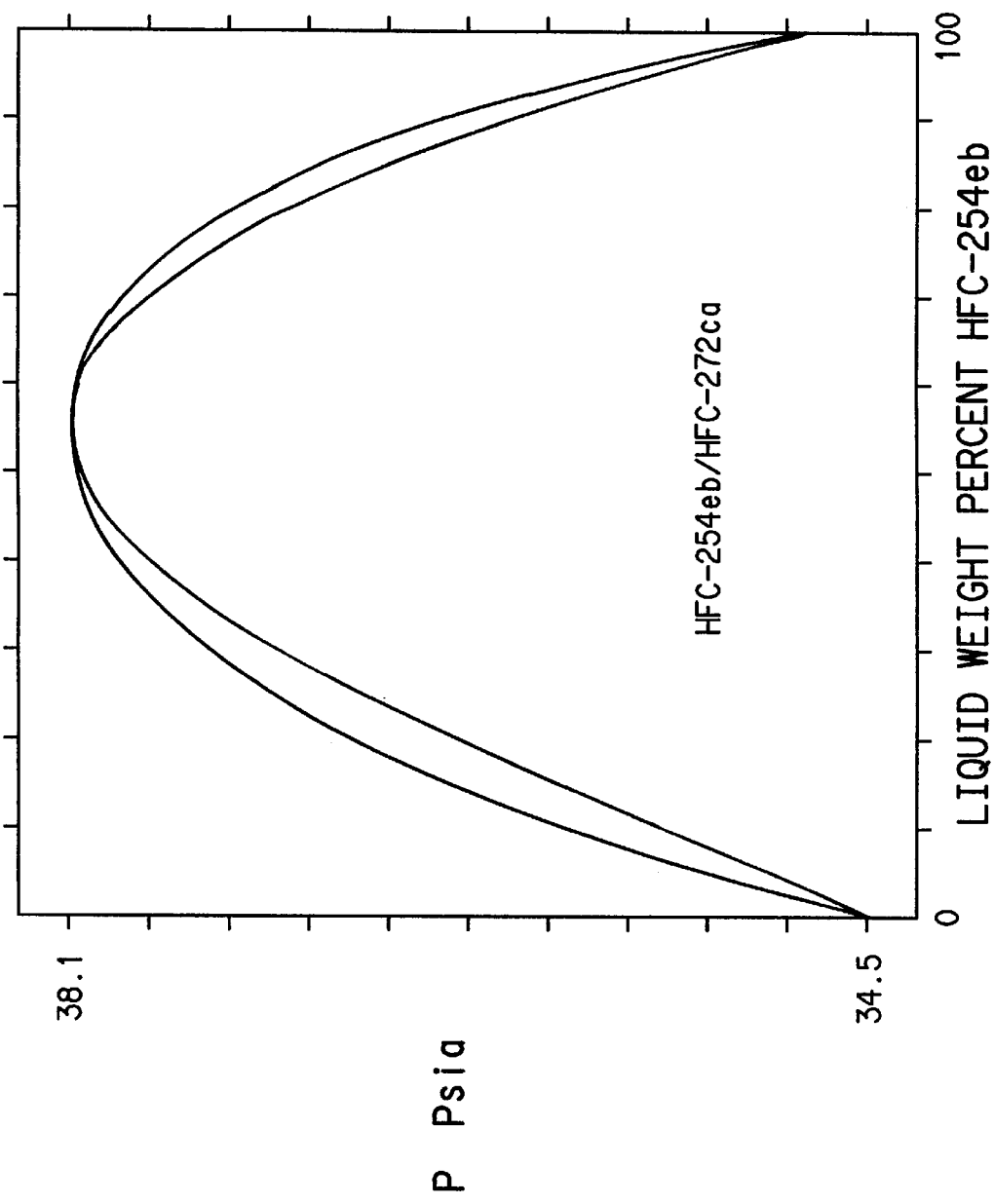
FIG. 14 is a graph of the vapor/liquid equilibrium curve for mixtures of HFC-254eb and HFC-272ca at 25° C.
Figure 15:
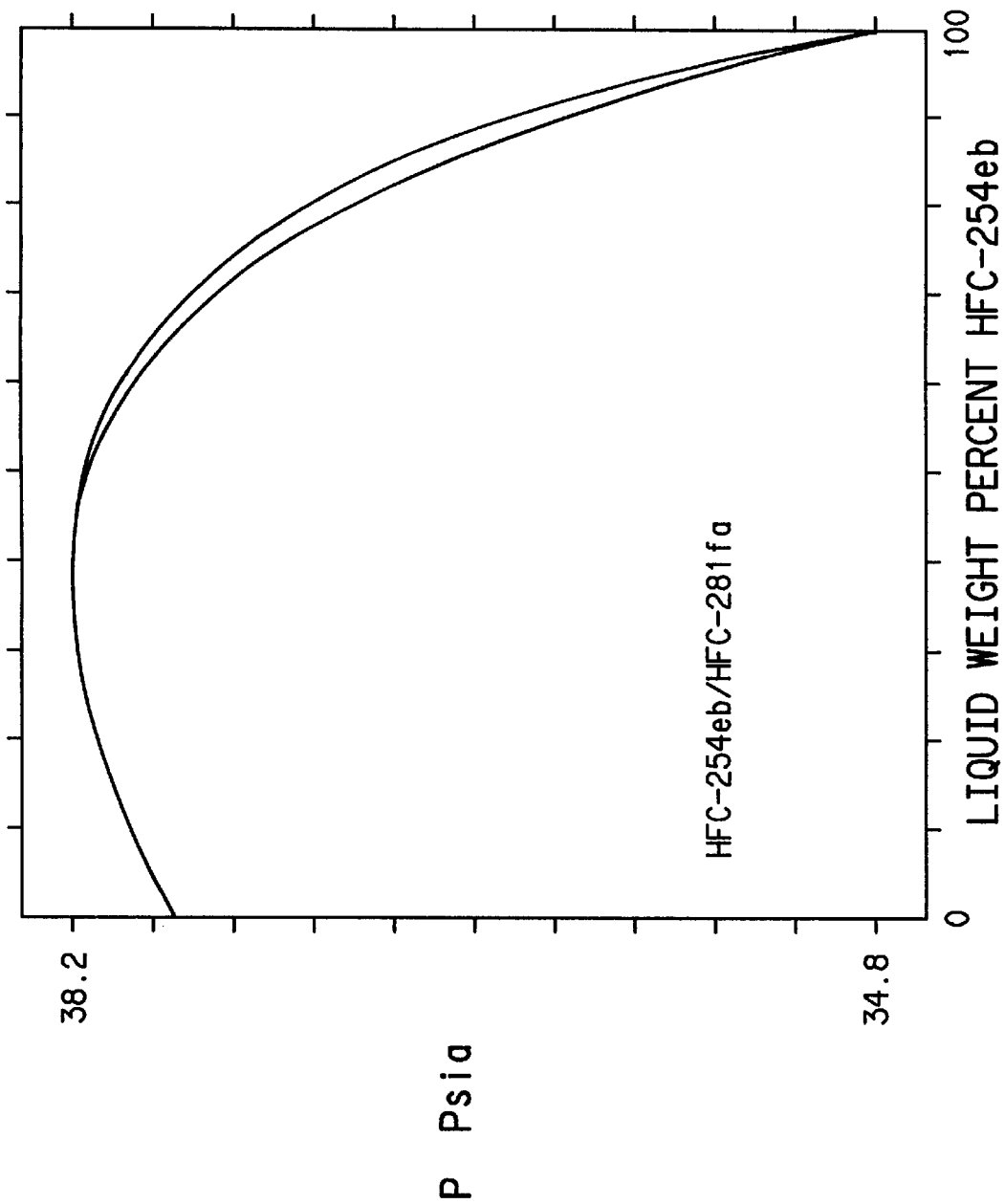
FIG. 15 is a graph of the vapor/liquid equilibrium curve for mixtures of HFC-254eb and HFC-281fa at 25° C.
Figure 16:
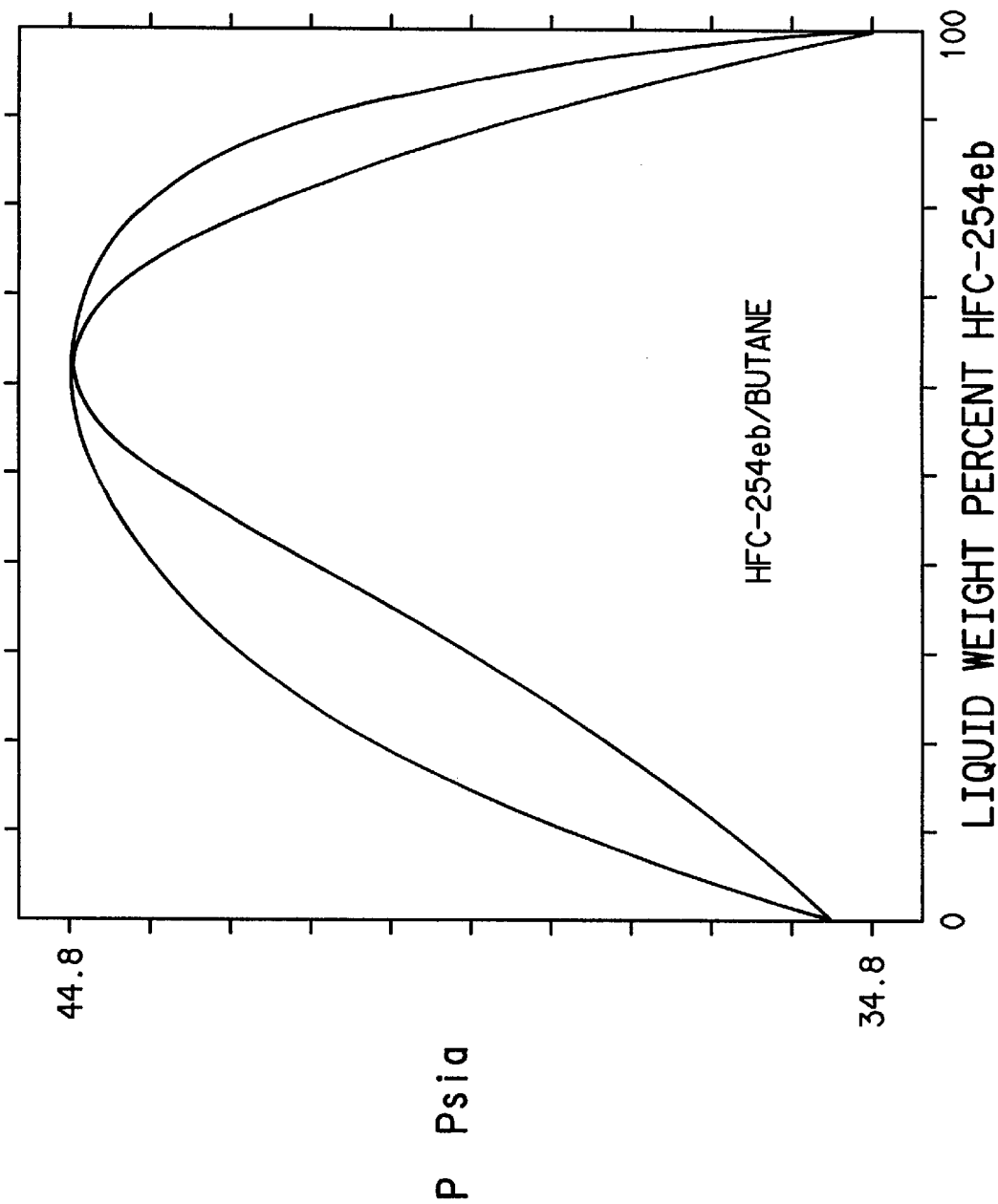
FIG. 16 is a graph of the vapor/liquid equilibrium curve for mixtures of HFC-254eb and butane at 25° C.
Figure 17:
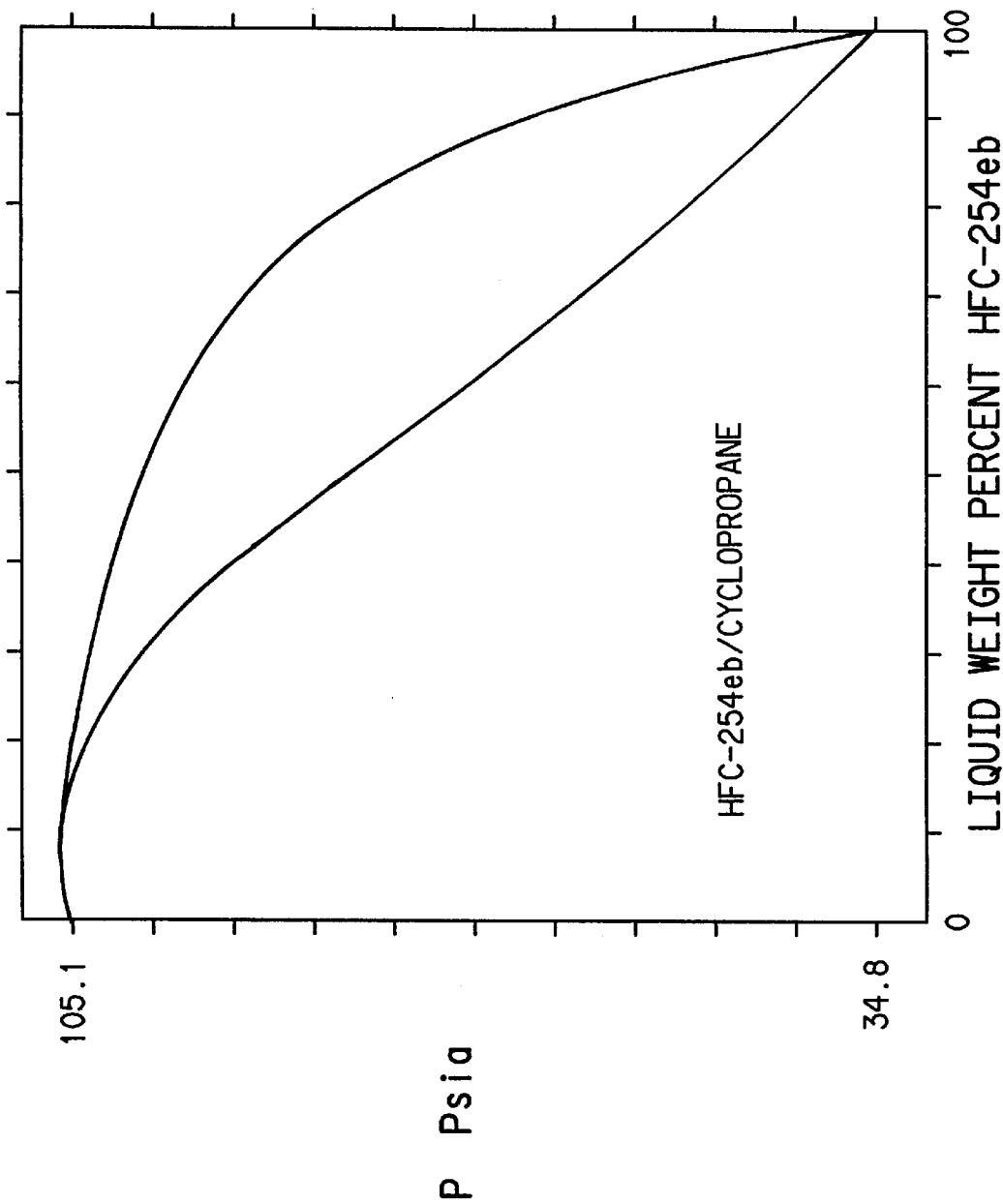
FIG. 17 is a graph of the vapor/liquid equilibrium curve for mixtures of HFC-254eb and cyclopropane at 25° C.
Figure 18:
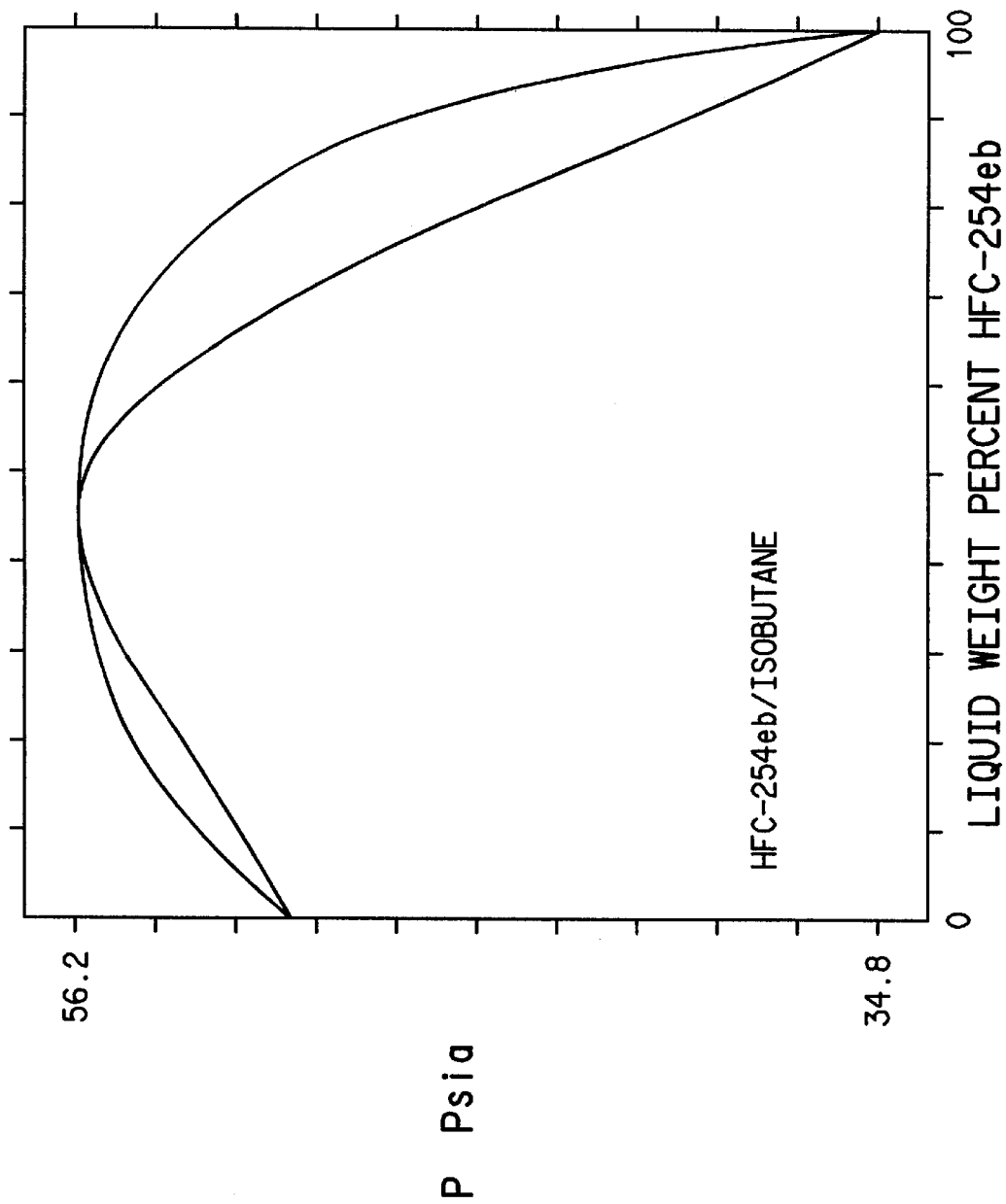
FIG. 18 is a graph of the vapor/liquid equilibrium curve for mixtures of HFC-254eb and isobutane at 25° C.
Figure 19:
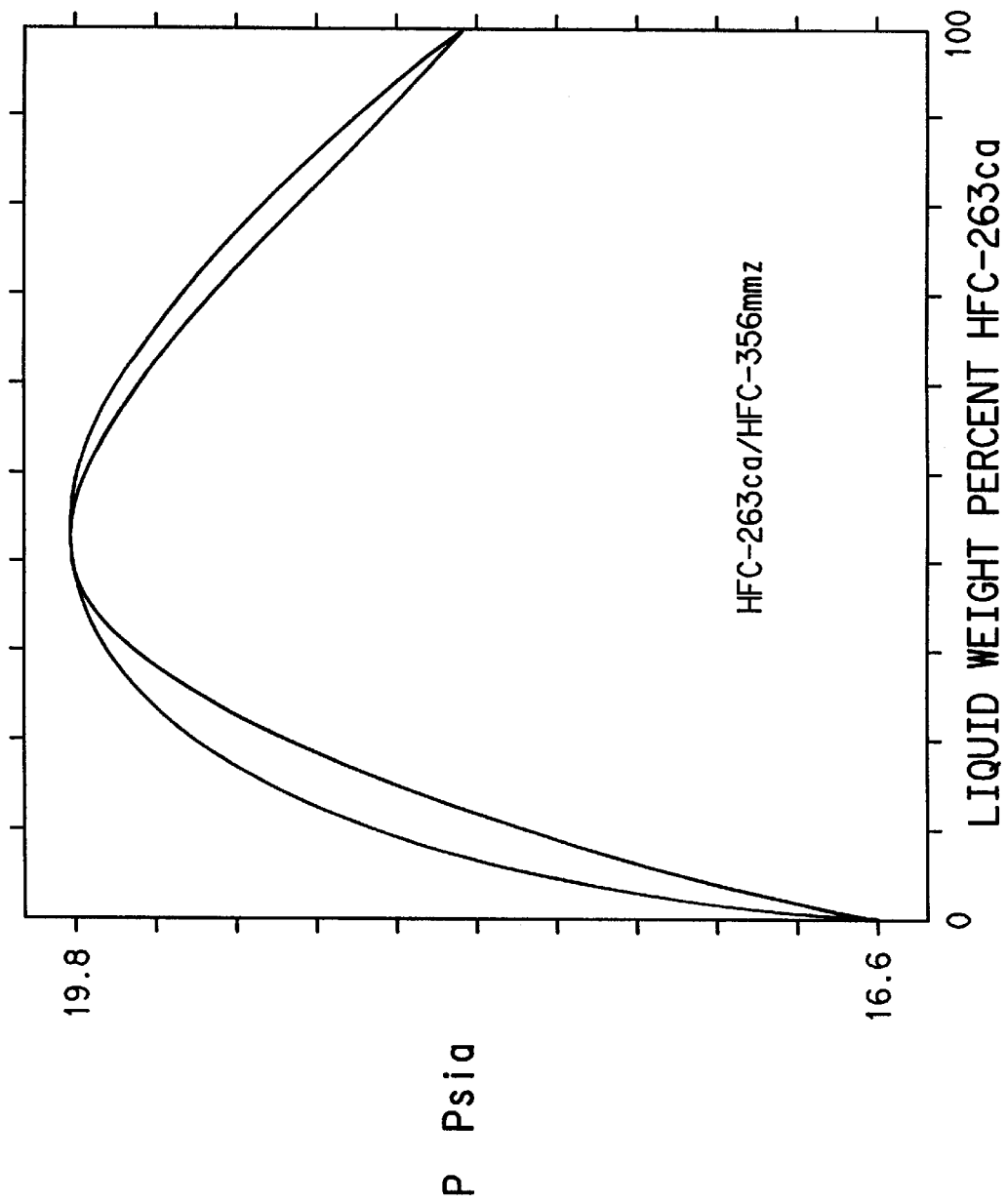
FIG. 19 is a graph of the vapor/liquid equilibrium curve for mixtures of HFC-263ca and HFC-356 mmz.
Figure 20:
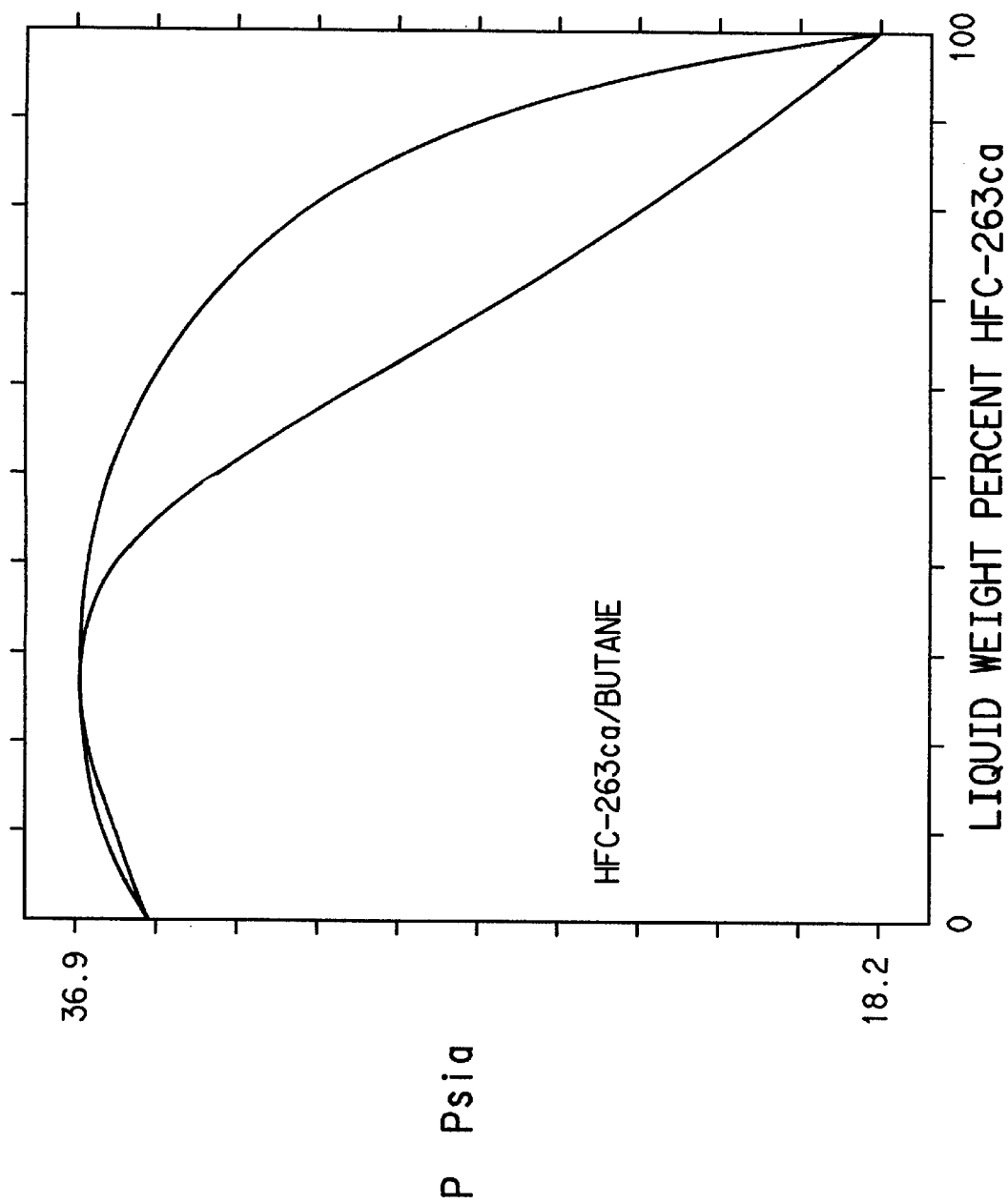
FIG. 20 is a graph of the vapor/liquid equilibrium curve for mixtures of HFC-263ca and butane.
Figure 21:
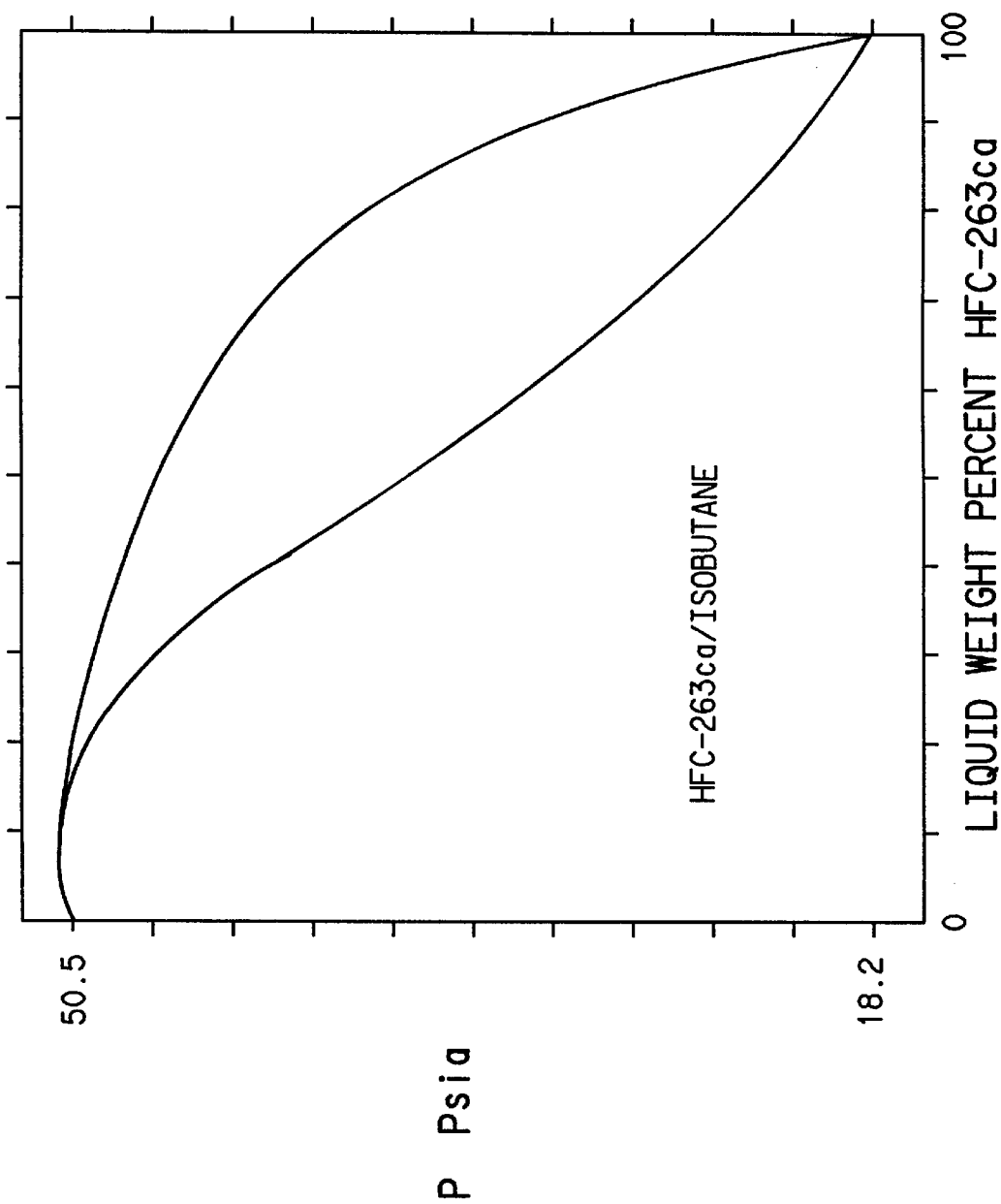
FIG. 21 is a graph of the vapor/liquid equilibrium curve for mixtures of HFC-263ca and isobutane.
Figure 22:
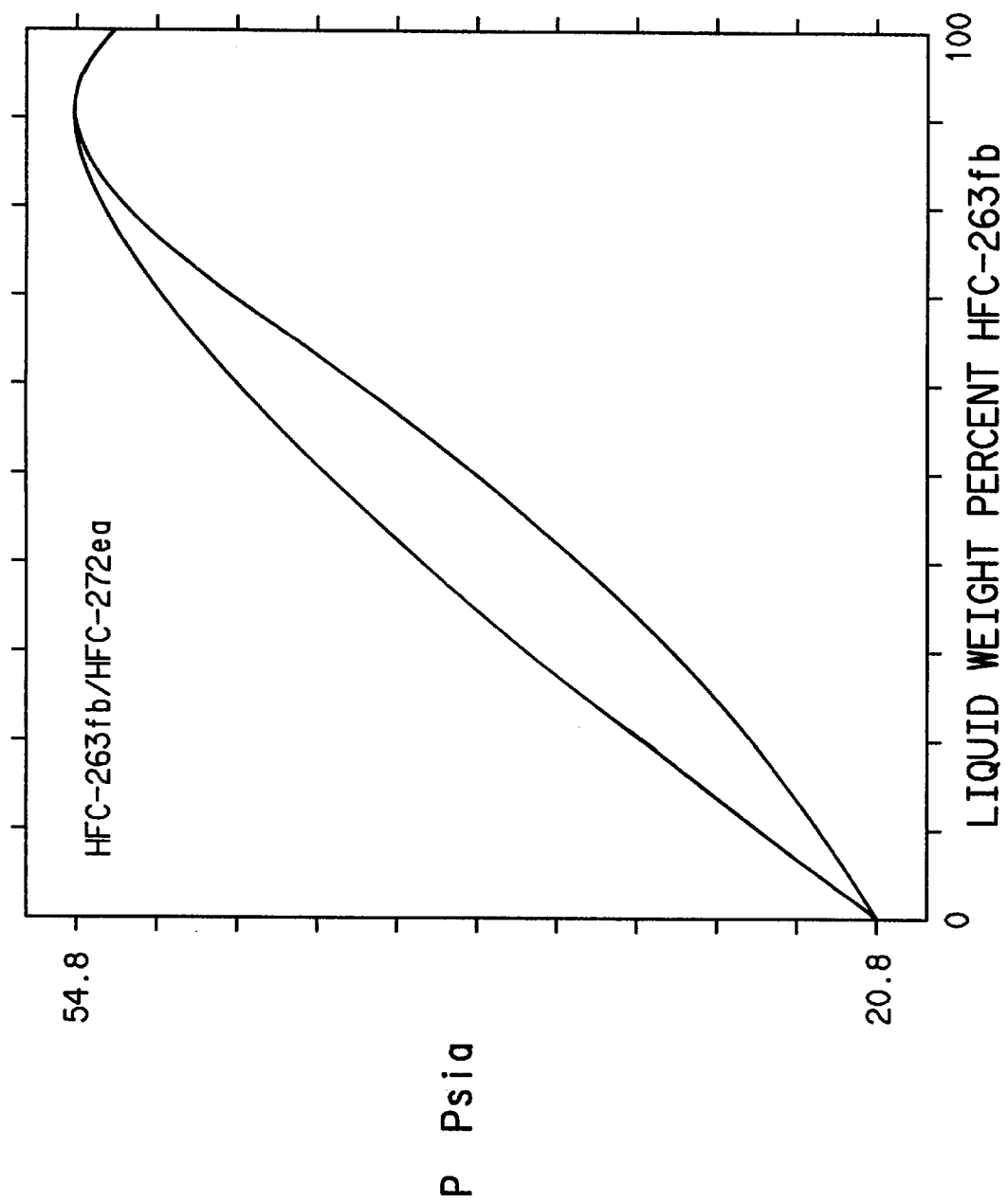
FIG. 22 is a graph of the vapor/liquid equilibrium curve for mixtures of HFC-263fb and HFC-272ea.
Figure 23:
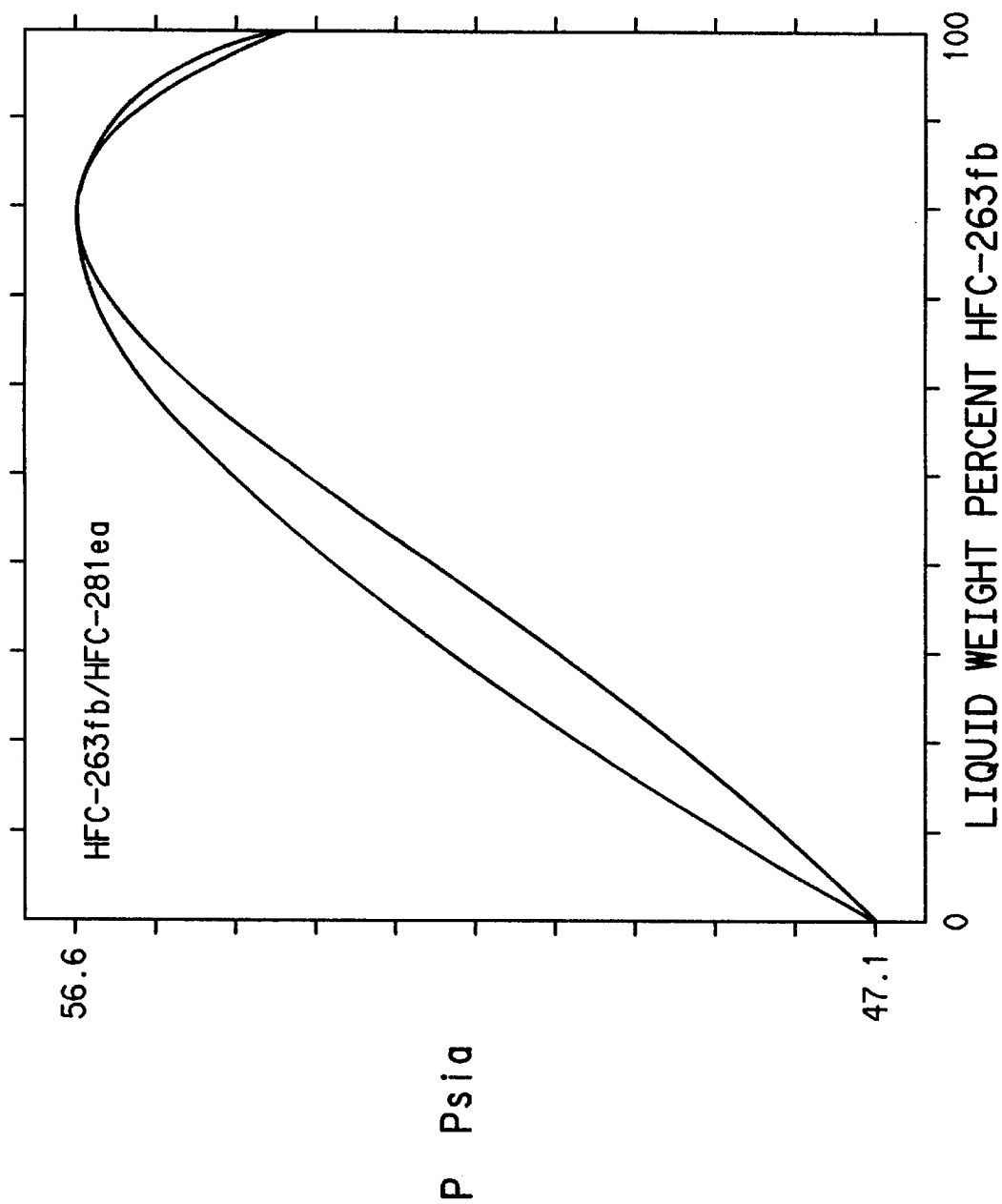
FIG. 23 is a graph of the vapor/liquid equilibrium curve for mixtures of HFC-263fb and HFC-281ea.
Figure 24:
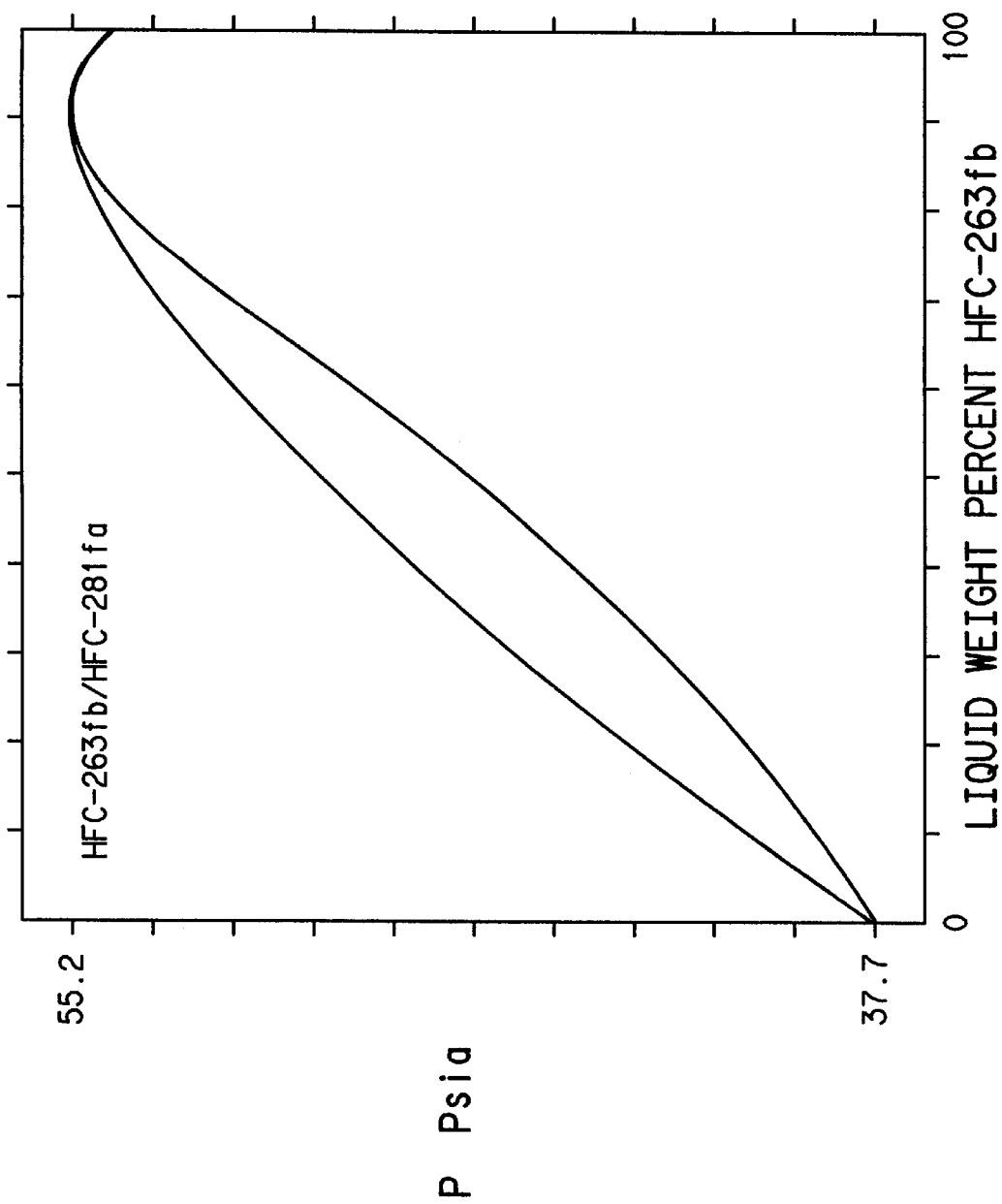
FIG. 24 is a graph of the vapor/liquid equilibrium curve for mixtures of HFC-263fb and HFC-281fa.
Figure 25:
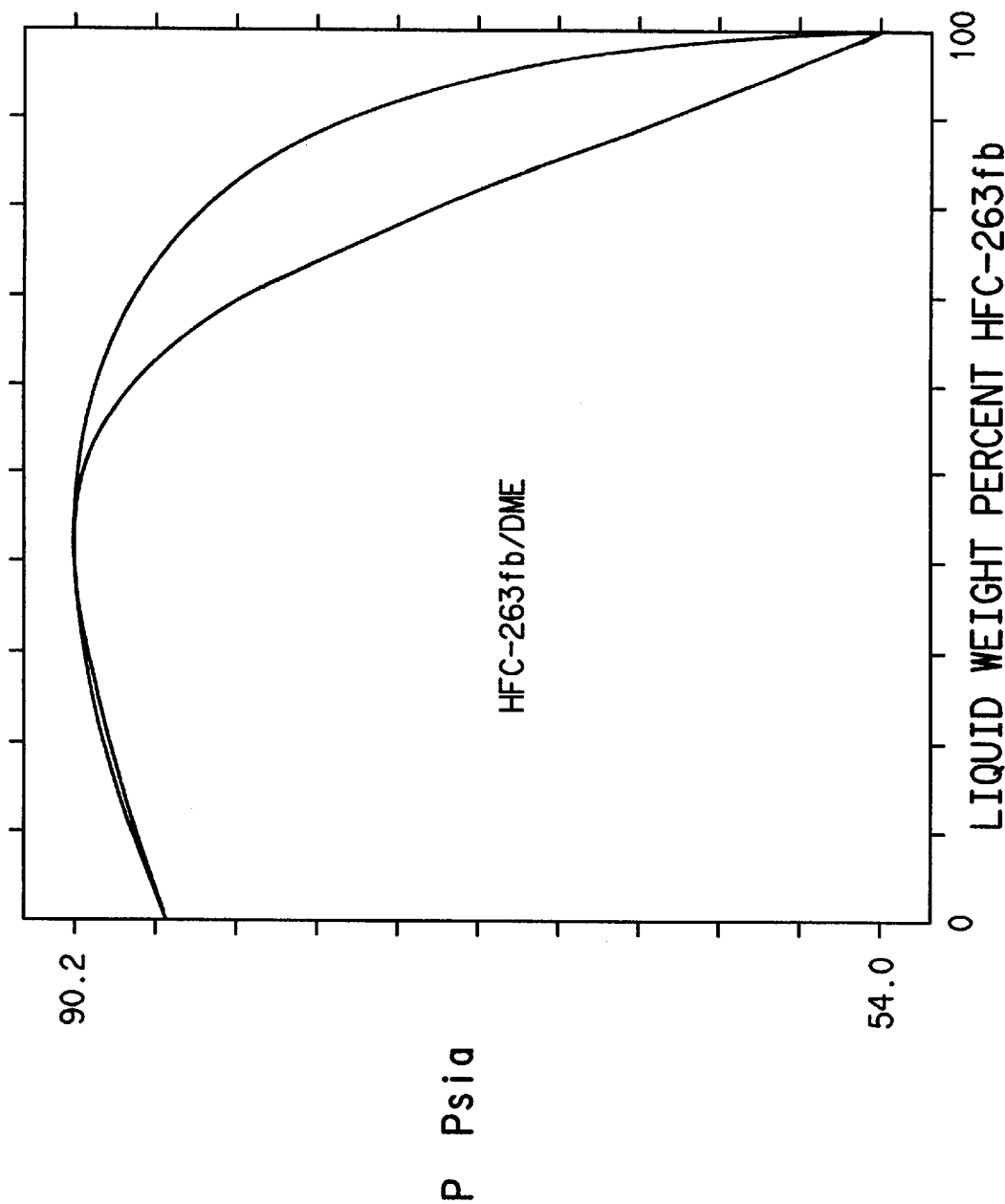
FIG. 25 is a graph of the vapor/liquid equilibrium curve for mixtures of HFC-263fb and DME.
Figure 26:
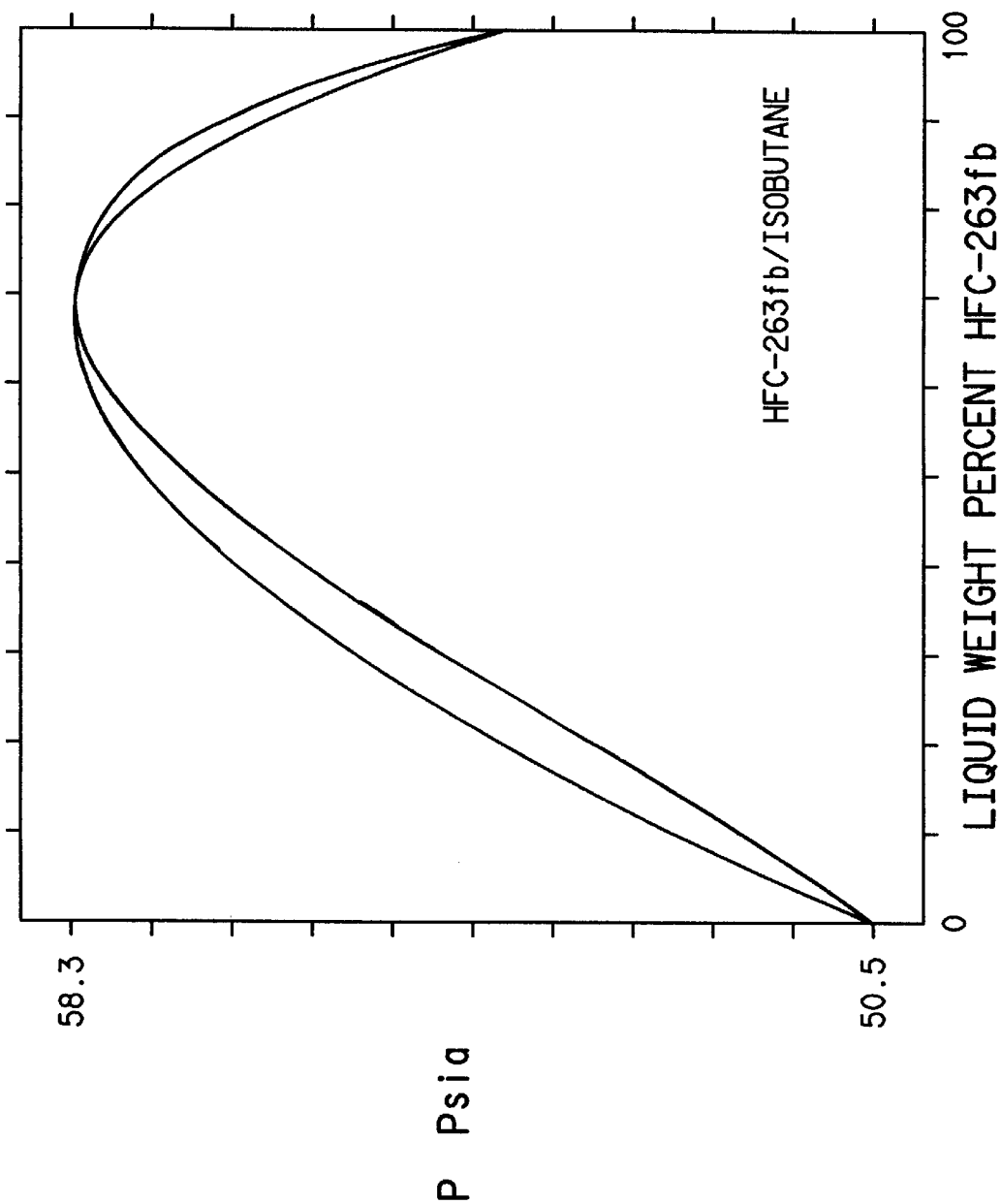
FIG. 26 is a graph of the vapor/liquid equilibrium curve for mixtures of HFC-263fb and isobutane.
Figure 27:
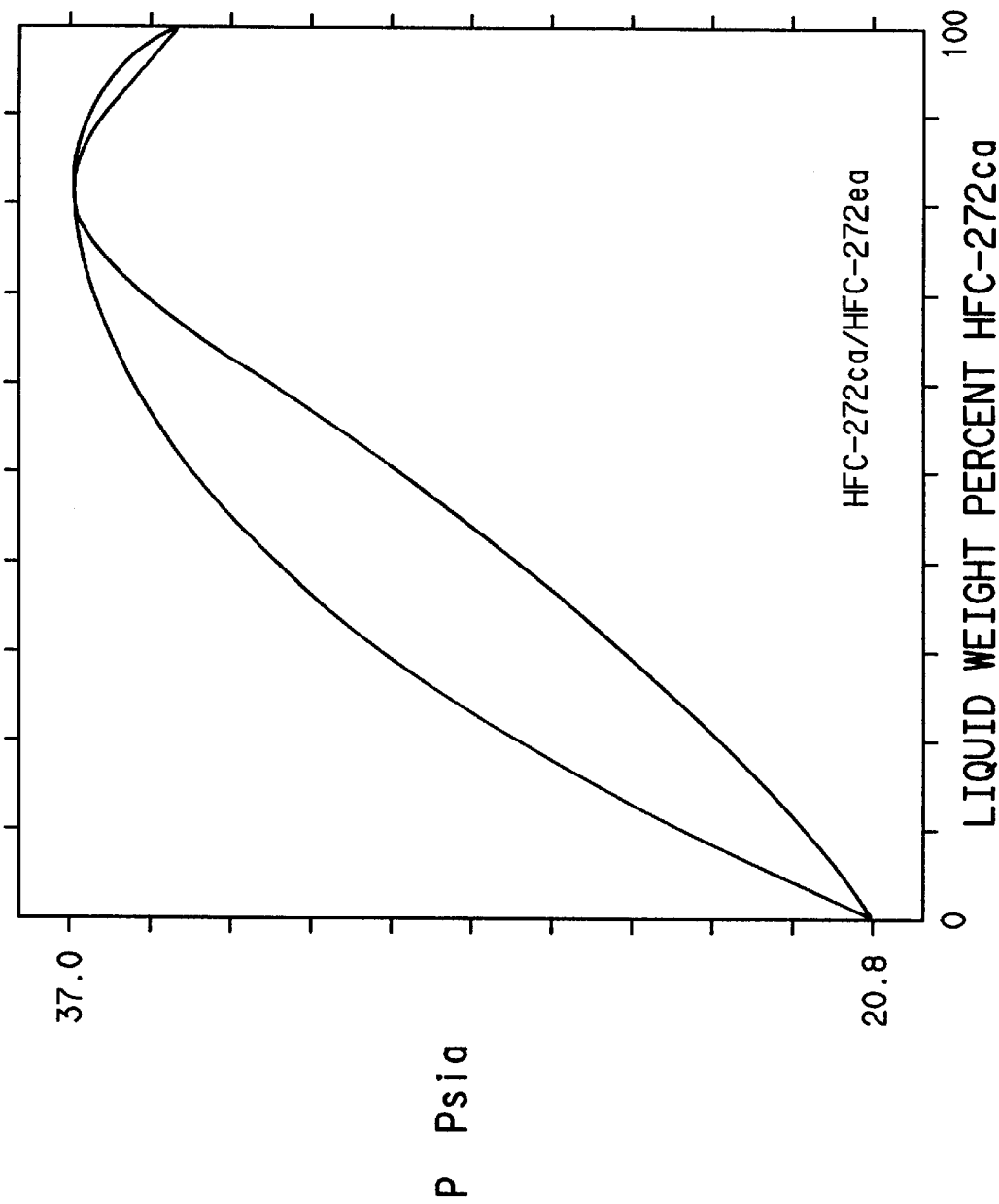
FIG. 27 is a graph of the vapor/liquid equilibrium curve for mixtures of HFC-272ca and HFC-272ea.
Figure 28:
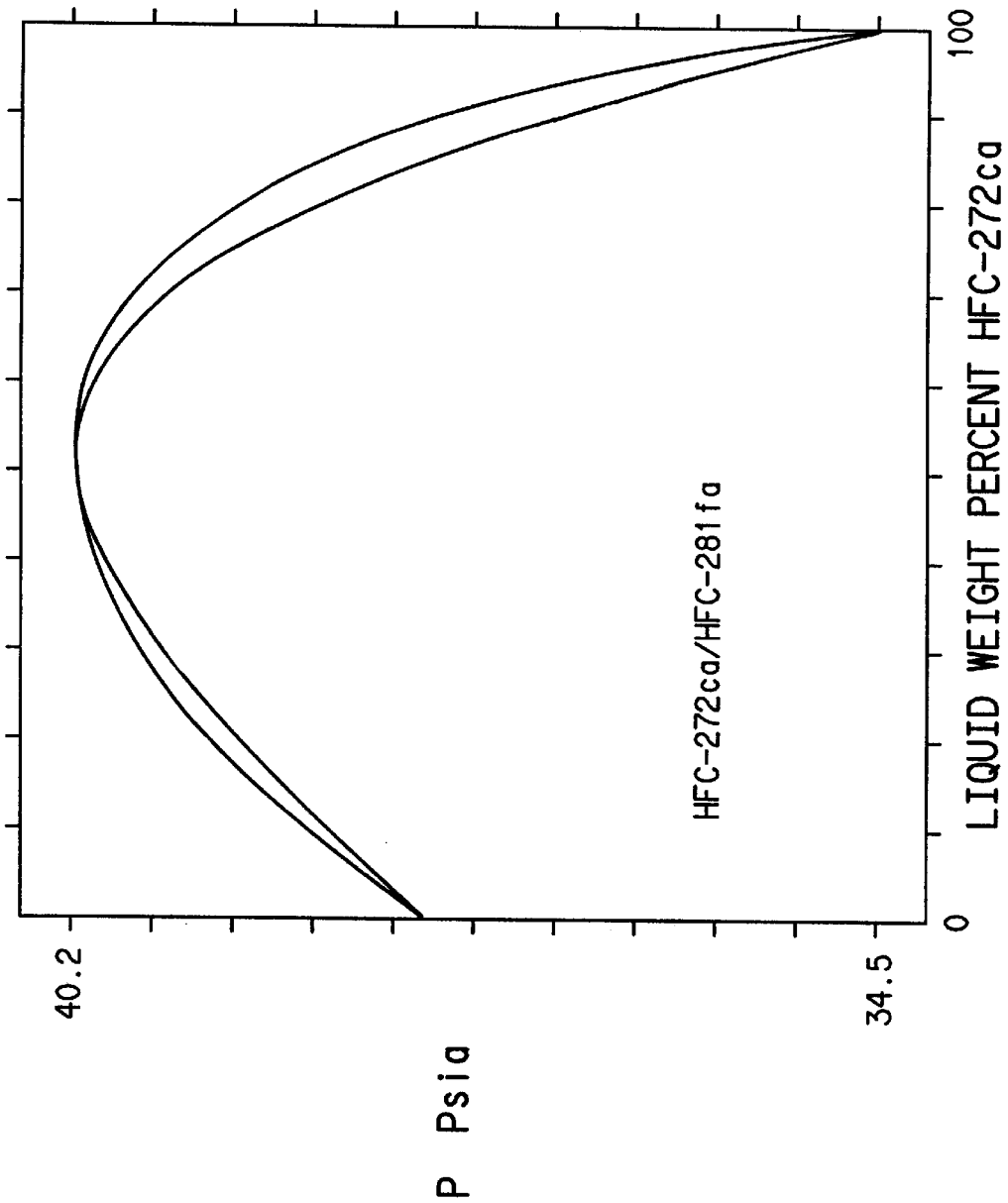
FIG. 28 is a graph of the vapor/liquid equilibrium curve for mixtures of HFC-272ca and HFC-281fa.
Figure 29:
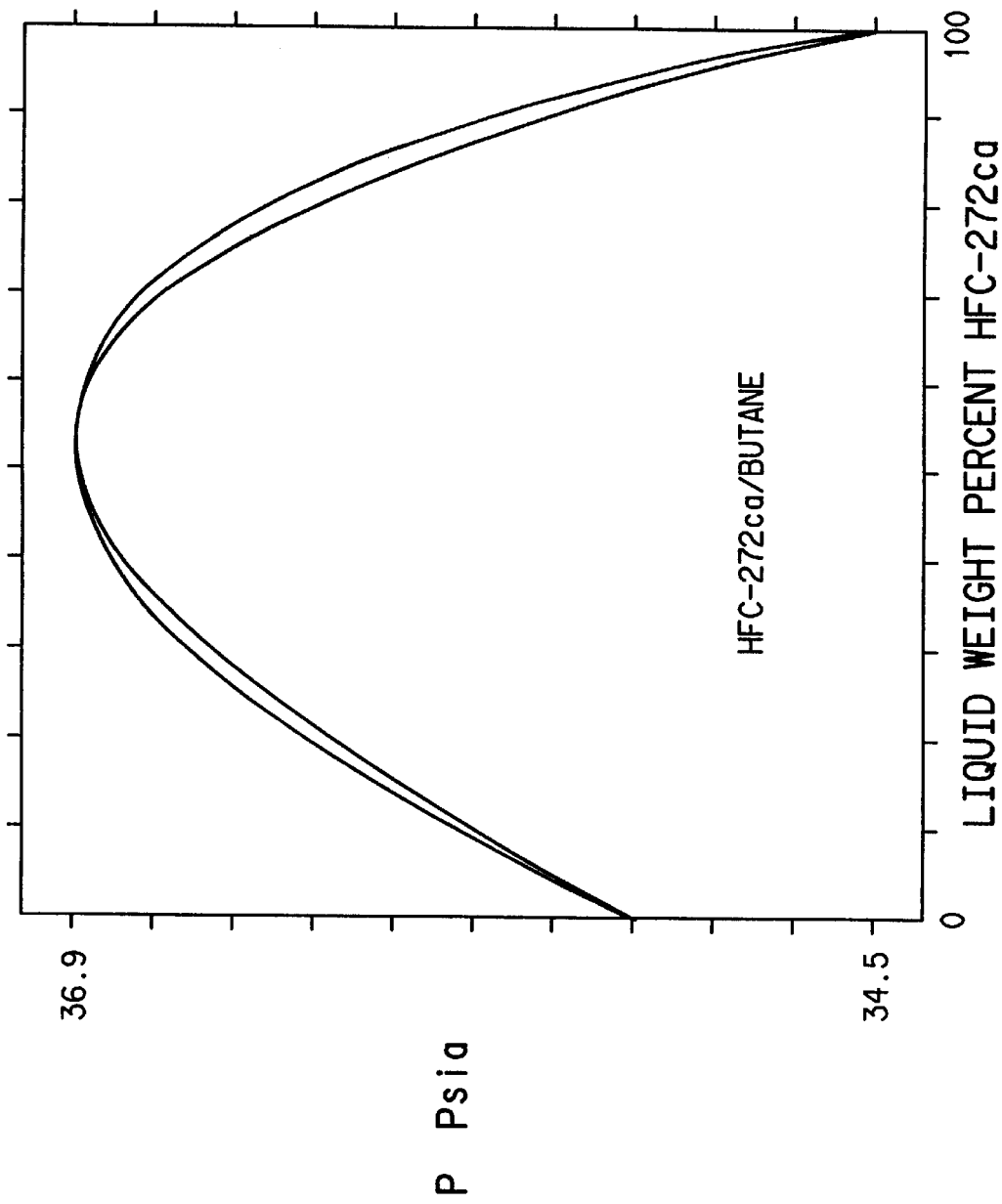
FIG. 29 is a graph of the vapor/liquid equilibrium curve for mixtures of HFC-272ca and butane.
Figure 30:
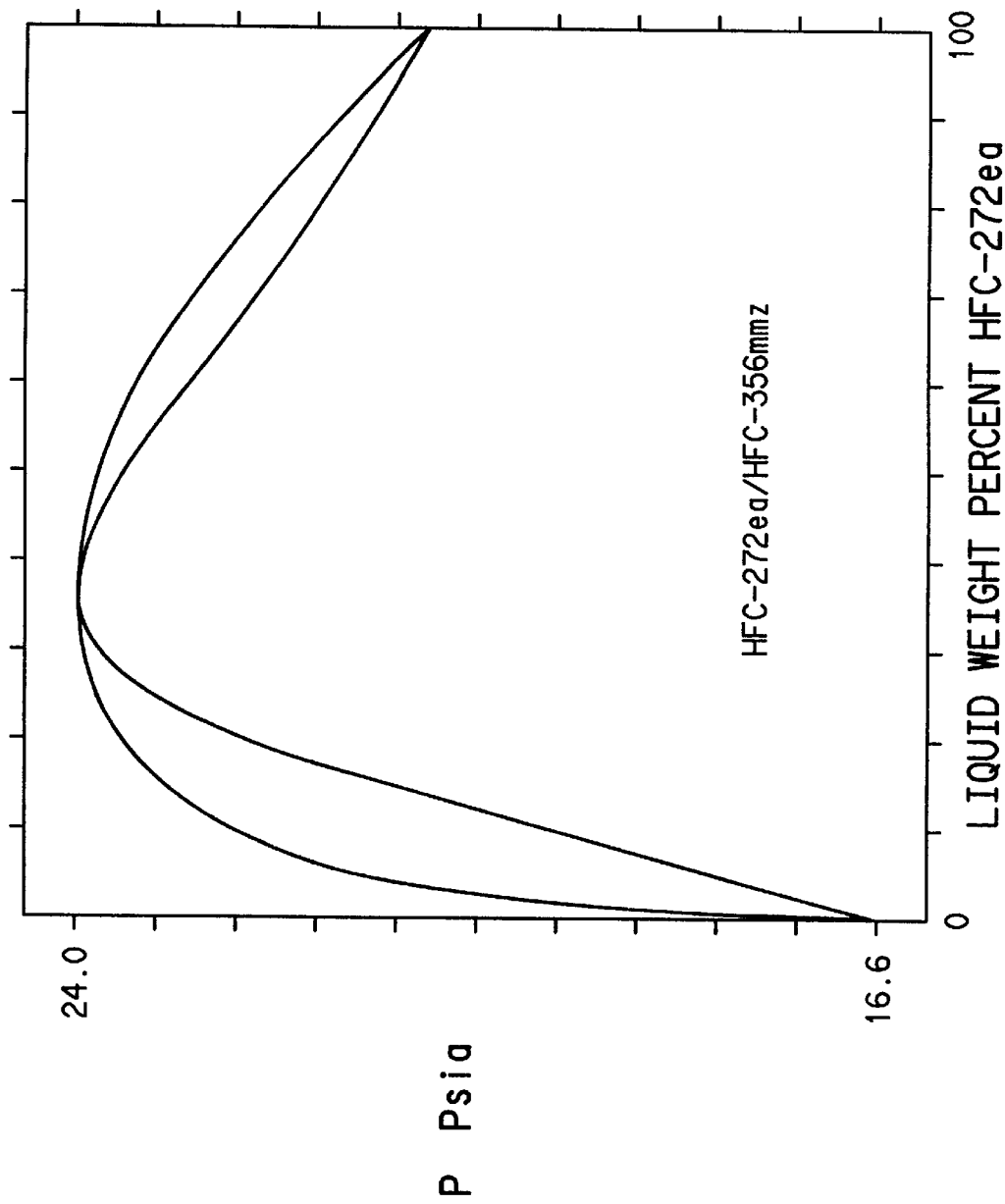
FIG. 30 is a graph of the vapor/liquid equilibrium curve for mixtures of HFC-272ea and HFC-356 mmz.
Figure 31:
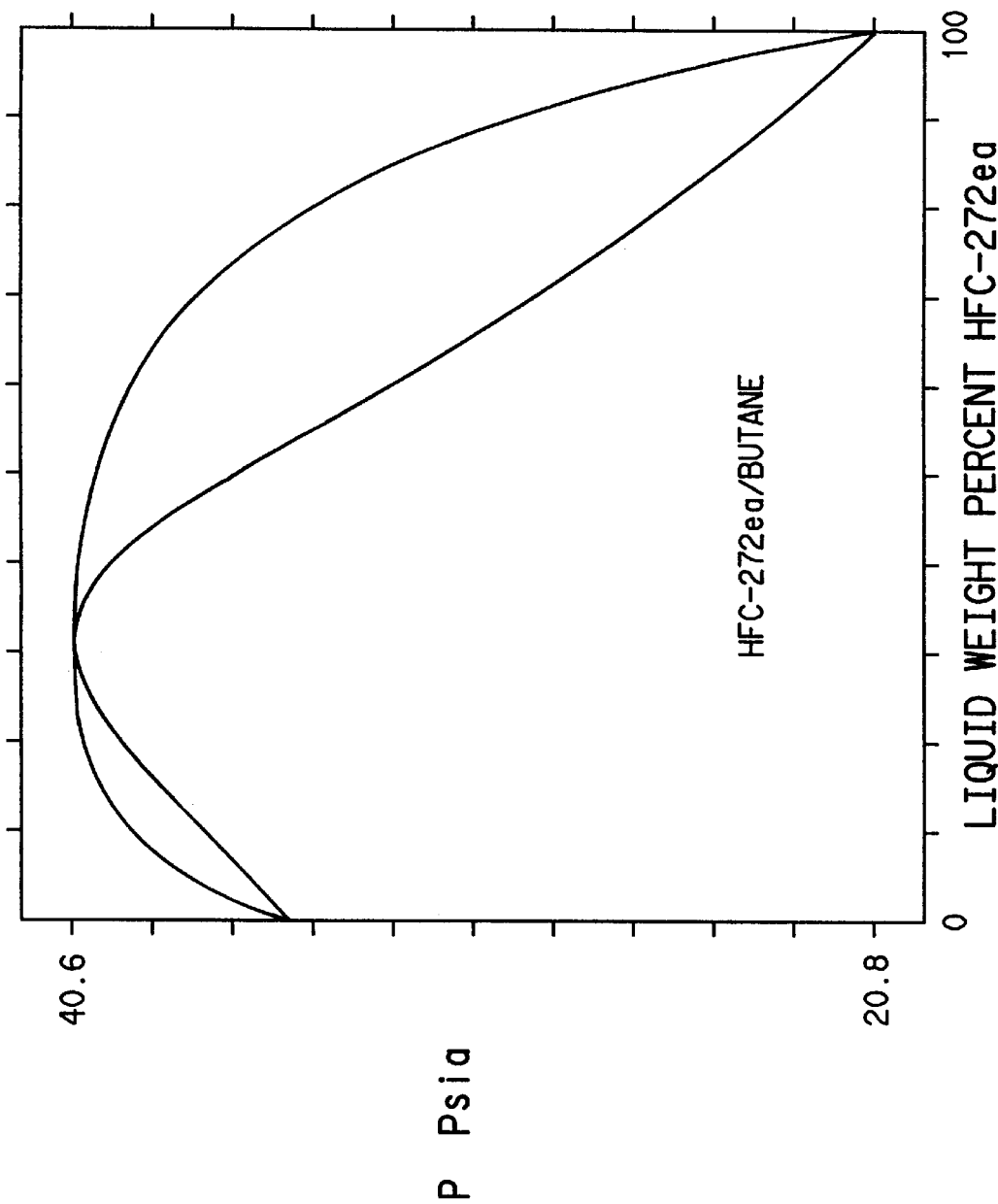
FIG. 31 is a graph of the vapor/liquid equilibrium curve for mixtures of HFC-272ea and butane.
Figure 32:
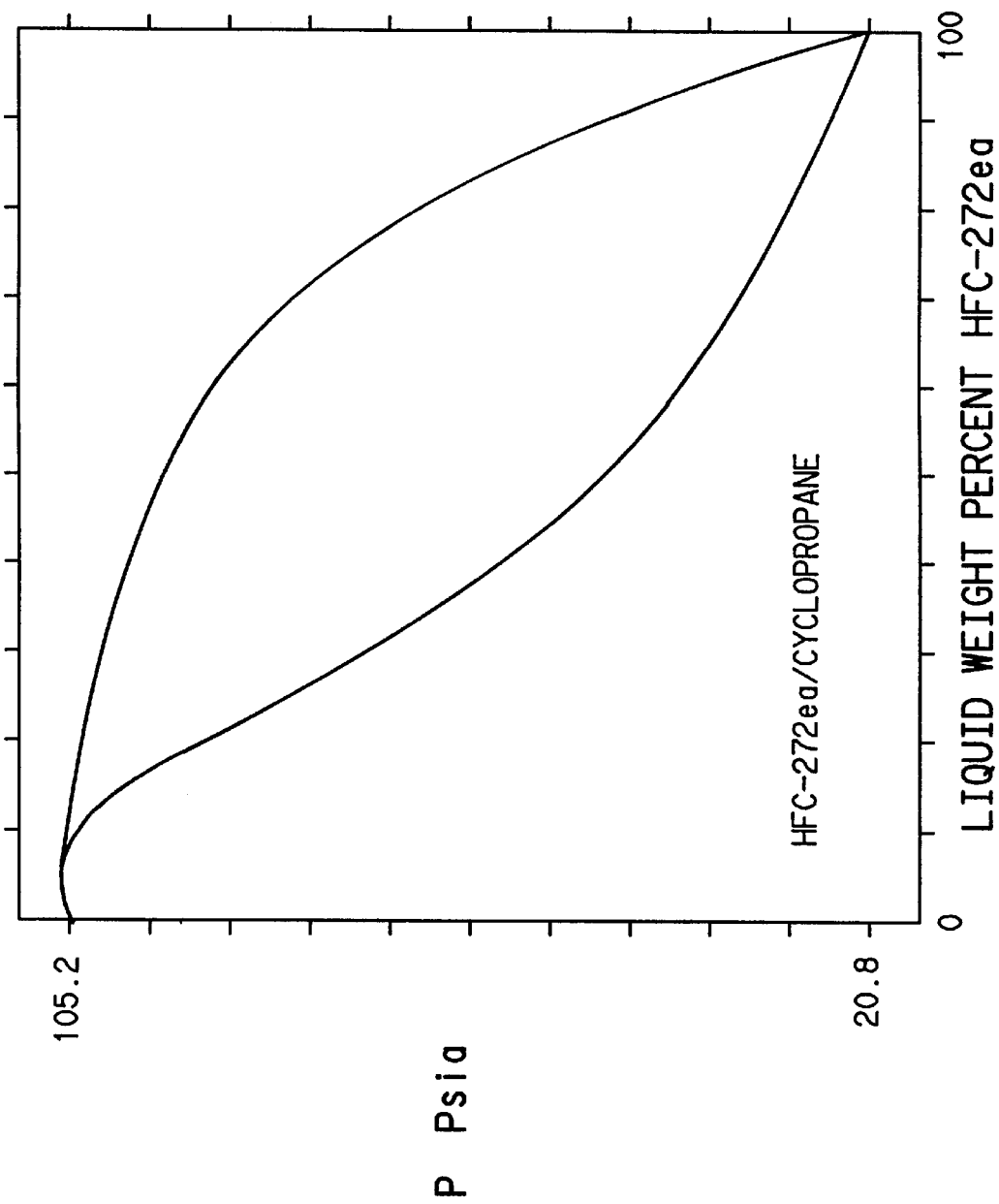
FIG. 32 is a graph of the vapor/liquid equilibrium curve for mixtures of HFC-272ea and cyclopropane.
Figure 33:
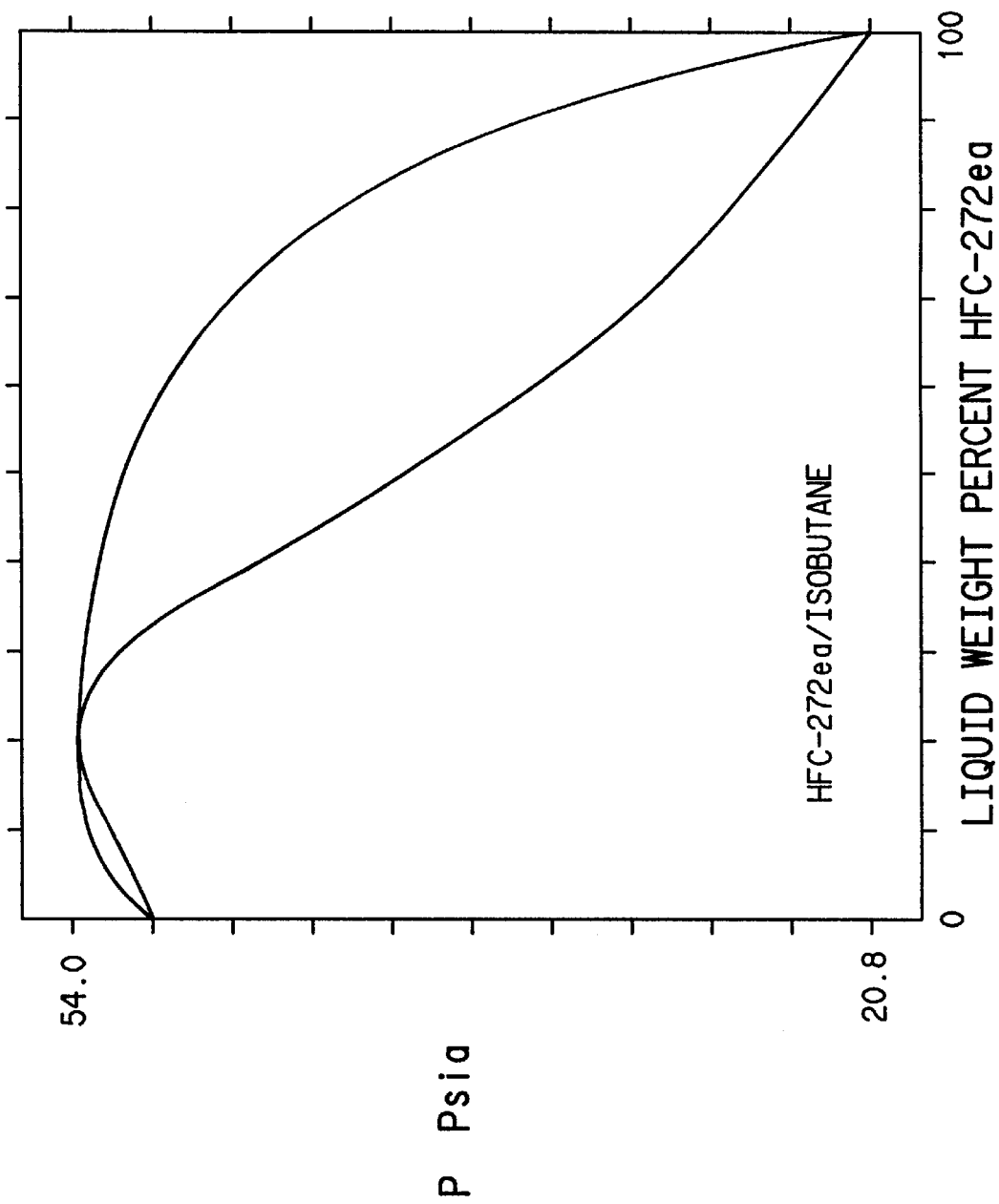
FIG. 33 is a graph of the vapor/liquid equilibrium curve for mixtures of HFC-272ea and isobutane.
Figure 34:
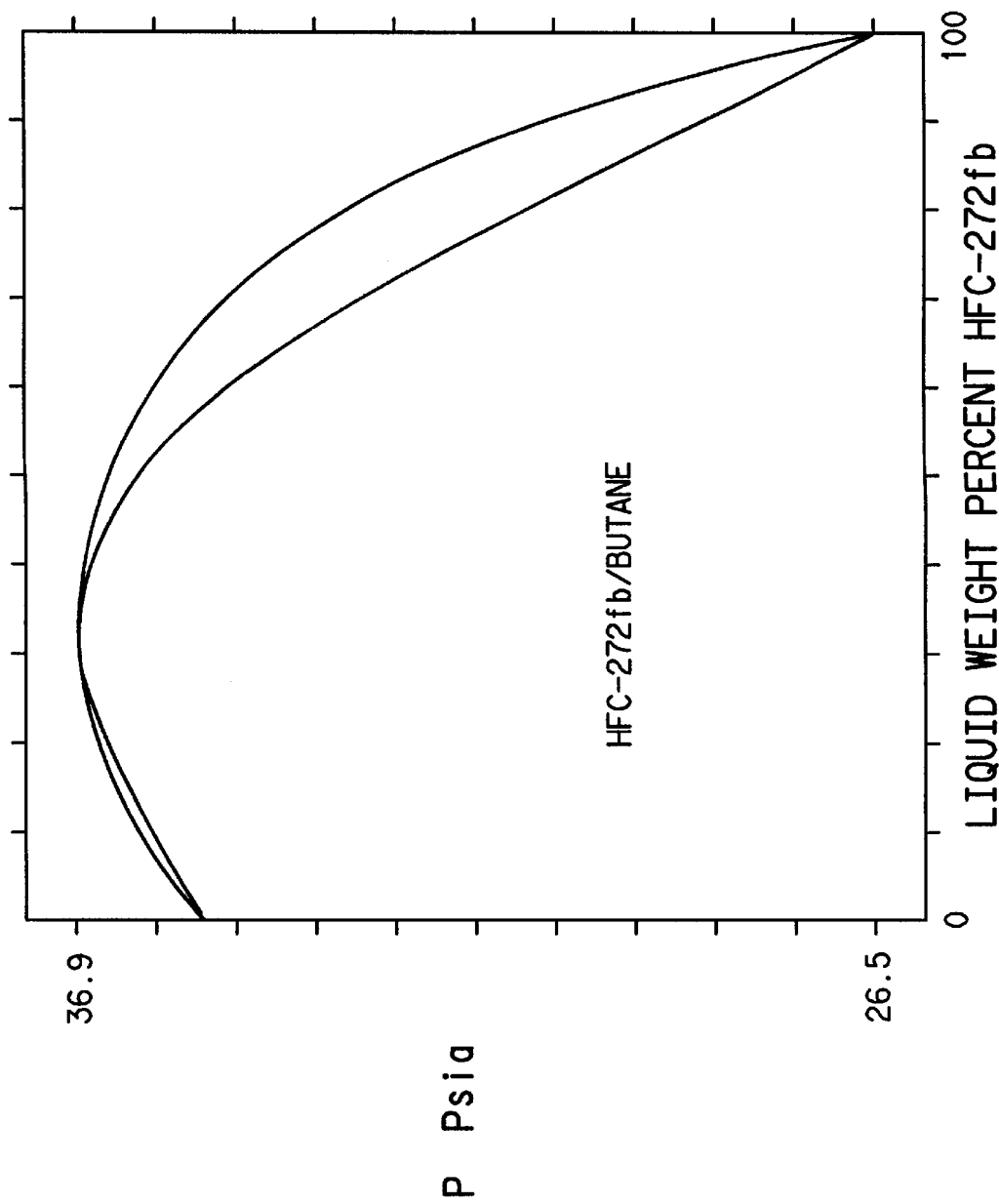

The data in FIG. 8 show that at 25° C., there are ranges of compositions that have vapor pressures lower than the vapor pressures of the pure components of the composition at that same temperature.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

ADDITIONAL COMPOUNDS

Other components, such as aliphatic hydrocarbons having a boiling point of −60 to +100° C., hydrofluorocarbonalkanes having a boiling point of −60 to +100° C., hydrofluoropropanes having a boiling point of between −60 to +100° C., hydrocarbon esters having a boiling point between −60 to +100° C., hydrochlorofluorocarbons having a boiling point between −60 to +100° C., hydrofluorocarbons having a boiling point of −60 to +100° C., hydrochlorocarbons having a boiling point between −60 to +100° C., chlorocarbons and perfluorinated compounds, can be added to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provided they do not have an adverse influence on the composition for its intended application. Preferred lubricants include esters having a molecular weight greater than 250.

I claim:

1. A process for producing a propellant composition for use with aerosols, which comprises using the composition consisting essentially of the following compounds in amounts effective to form a binary azeotrope or azeotrope-like composition having a vapor pressure at 25° C. higher than that of each compound of the binary composition:

a. 1–50 weight percent 1-fluoropropane and 50–99 weight percent isobutane, and b. 10–99 weight percent 1-fluoropropane and 1–90 weight percent butane.

2. A process as in claim 1 wherein said binary azeotrope or azeotrope-like composition consists of 1–50 weight percent 1-fluoropropane and 50–99 weight percent isobutane.

3. A process as in claim 1 wherein said binary azeotrope or azeotrope-like composition consists of 10–99 weight percent 1-fluoropropane and 1–90 weight percent butane.

* * * * *